US008331789B2

(12) United States Patent
Kawamata et al.

(10) Patent No.: US 8,331,789 B2
(45) Date of Patent: Dec. 11, 2012

(54) OPERATION TERMINAL

(75) Inventors: Mototsugu Kawamata, Mie (JP); Yuichi Yoshimura, Osaka (JP)

(73) Assignee: Panasonic Corporation, Osaka (JP)

( * ) Notice: Subject to any disclaimer, the term of this patent is extended or adjusted under 35 U.S.C. 154(b) by 823 days.

(21) Appl. No.: 12/385,803

(22) Filed: Apr. 21, 2009

(65) Prior Publication Data

US 2009/0269071 A1 Oct. 29, 2009

(30) Foreign Application Priority Data

Apr. 24, 2008 (JP) ................................ 2008-114607
Apr. 24, 2008 (JP) ................................ 2008-114608
Apr. 24, 2008 (JP) ................................ 2008-114609

(51) Int. Cl.
*H04B 10/00* (2006.01)
*H04B 13/02* (2006.01)

(52) U.S. Cl. ......................... 398/107; 398/106; 398/109

(58) Field of Classification Search ........... 398/106–114
See application file for complete search history.

(56) References Cited

FOREIGN PATENT DOCUMENTS

| | | | | |
|---|---|---|---|---|
| JP | 11-8950 | | | 1/1999 |
| JP | 11008950 | A | * | 1/1999 |
| JP | 2006-252985 | | | 9/2006 |
| JP | 2006252985 | A | * | 9/2006 |

* cited by examiner

*Primary Examiner* — Kenneth N Vanderpuye
*Assistant Examiner* — Daniel Dobson
(74) *Attorney, Agent, or Firm* — Bacon & Thomas, PLLC

(57) ABSTRACT

An operation terminal includes a communication unit; an operation terminal control unit; a plurality of on-period light-emitting units provided in a one-to-one correspondence to the control switches and controlled by the operation terminal control unit; a plurality of off-period light-emitting units provided in a one-to-one correspondence to the control switches and controlled by the operation terminal control unit to emit light when the load associated with the corresponding one of the control switches by relational data is in an off-state; and a housing. At least one half of the control switches are arranged one above another in a vertical direction and each of the on-period light-emitting units is arranged in such a fashion as to transversely interpose the corresponding one of the control switches between itself and the corresponding one of the off-period light-emitting units when seen from the front side.

11 Claims, 30 Drawing Sheets

OPERATION TERMINAL

FIELD OF THE INVENTION

The present invention relates to an operation terminal for use in a remote monitoring and control system.

BACKGROUND OF THE INVENTION

Conventionally, there is provided a remote monitoring and control system that makes use of a time division multiplex signal (see, e.g., Japanese Laid-open Publication No. 11-008950, Japanese Laid-open Publication No. 5-300575, and Japanese Laid-open Publication No. 2001-086577). This kind of remote monitoring and control system is schematically shown in FIG. 28.

The remote monitoring and control system includes a transmission control unit CU, a plurality of (two, in FIG. 28) operation terminals 1 and a plurality of (two, in FIG. 28) control terminals RU. The operation terminals 1 and the control terminals RU are connected to the transmission control unit CU via a two-wire signal line Ls.

Each of the operation terminals 1 is provided with at least one control switch (four control switches in FIG. 28) having push button handle portions 51 pushed and operated by a pushing force applied from the front side thereof.

Each of the control terminals RU includes at least one relay (not shown) arranged in a power supply line leading to a load (not shown) such as an illumination device or a ventilating fan. The load is on-off controlled by on-off controlling the relay.

Individual addresses are allotted to the respective control switches and the respective loads (more exactly, the respective relays). The number of addresses available in the system as a whole is two hundred fifty six (256) in total, which is the product of sixty four (64) channels numbered from 0 to 63 and four (4) circuits numbered from 1 to 4. Each of the addresses is identified as, e.g., 63-3, using the channel number and the circuit number.

The transmission control unit CU delivers, through the signal line Ls, a transmission signal Vs with a format illustrated in FIG. 29A. In other words, the transmission signal Vs is a time division multiplex signal, which is a bipolar signal (±24 V), including a synchronization signal SP indicative of signal delivery commencement, mode data MD indicative of the mode of the transmission signal Vs, address data AD for use in specifically calling out the operation terminals 1 or the control terminals RU, control data CD for use in controlling the load, checksum data CS for use in detecting a transmission error and a response waiting time slot WT, i.e., a time slot during which to receive a response signal (i.e., monitoring data) from the operation terminals 1 or the control terminals RU. With the transmission signal Vs, data are transmitted through pulse width modulation as illustrated in FIG. 29B.

If the address data AD of the transmission signal Vs received through the signal lines Ls coincide with a pre-set address, the operation terminals 1 and the control terminals RU capture the control data CD from the transmission signal Vs and return monitoring data, as a current mode signal (a signal delivered by short-circuiting the signal lines Ls via suitable low impedance), to the transmission control device 100 during the response waiting time slot WT.

In case where data are delivered from the transmission control unit CU to a desired one of the operation terminals 1 and the control terminals RU, the transmission control unit CU delivers a transmission signal Vs whose mode data MD is in a control mode and whose address data AD is matched with the address of one of the operation terminals 1 or the control terminals RU. As the transmission signal Vs is delivered to the signal line Ls, the operation terminals 1 or the control terminals RU, whichever have an address coinciding with the address data AD, capture the control data CD and return monitoring (status) data to the transmission control unit CU during the response waiting time slot WT. Based on the relationship between the control data CD delivered and the monitoring data received during the response waiting time slot WT, the transmission control unit CU conforms that the control data CD have been transmitted to the desired operation terminal 1 or the desired control terminal RU. The control terminal RU outputs a control signal for controlling a load according to the control data CD received. The operation terminal 1 outputs an indication signal for identifying and indicating the operation of the load according to the control data CD received.

At normal times, the transmission control unit CU is periodically delivering the transmission signal Vs in which the mode data MD is in a dummy mode (this will be referred to as “normal polling”). In this case, the transmission control unit CU gains access to an arbitrary one of the control terminals RU and requests it to send the monitoring data indicative of a load status back to the transmission control unit CU. Responsive this request, the control terminal RU sends back to the transmission control unit CU the monitoring data indicative of the status of a load connected thereto. Upon receiving the reply, the transmission control unit CU gains access to the address of the operation terminal 1 corresponding to the control terminal RU and transmit to the operation terminal 1 the control data CD needed to indicate the status of the load connected to the control terminal RU.

In this manner, the operation of gaining access to the addresses of the control terminal RU and the operation terminal 1 corresponding thereto is cyclically repeated in the normal polling.

When an attempt is made to transmit certain information to the transmission control unit CU during the normal polling times, an interrupt signal Vi as shown in FIG. 29C is generated in synchronization with the synchronization signal SP of the dummy-mode transmission signal Vs. At this time, the operation terminal 1 sets an interrupt flag in preparation for the subsequent information delivery to and from the transmission control unit CU. Upon receiving the interrupt signal Vi, the transmission control unit CU delivers a transmission signal while setting the mode data MD in an interrupt polling mode and gradually increasing the upper half bits of the address data AD (the upper four bits in case of the address data AD being eight bits).

If the upper four bits of the address data AD of the transmission signal delivered in the interrupt polling mode coincide with the upper four bits of the address of the operation terminal 1, the operation terminal 1 that has generated the interrupt signal Vi sends the lower four bits of the address thereof back to the transmission control unit CU during the response waiting time slot WT. In this manner, the transmission control unit CU searches for sixteen operation terminals 1 at one time to find the one that has generated the interrupt signal Vi. This makes it possible to find the operation terminal 1 within a relatively short period of time.

Once the transmission control unit CU acquires the address of the operation terminal 1 that has generated the interrupt signal Vi, it delivers to the signal line Ls a transmission signal Vs which contains the mode data in a monitoring mode and the address data AD indicative of the address thus acquired. Responsive to this transmission signal Vs, the operation terminal 1 sends back to the transmission unit 105*a* the information sought for transmission within the response waiting time slot WT. Finally, the transmission control unit CU delivers a signal by which the operation terminal 1 that has generated the interrupt signal Vi is instructed to reset the interrupt, thereby canceling the interrupt flag.

In the manner as set forth above, the information transmission from the operation terminal 1 to the transmission control unit CU is completed by transmitting signals (including the dummy mode signal, the interrupt polling mode signal, the monitoring mode signal and the interrupt reset signal) four times from the transmission control unit CU to the operation terminal 1. In order for the transmission control unit CU to learn the operating status of a desired one of the control terminals RU, it is sufficient to merely deliver a transmission signal in which the mode data MD is in the monitoring mode.

If the push button handle portion 51 of one of the control switches is pushed, the operation terminal 1 sends back to the transmission control unit CU the monitoring data which contains information on the address of the control switch whose push button handle portion 51 is pushed. The transmission control unit CU generates control data CD using this monitoring data and transmits a transmission signal Vs containing the control data CD to the control terminal RU. The control terminal RU controls a load according to the control data CD contained in the transmission signal Vs. After controlling the load, the control terminal RU sends monitoring data back to the transmission control unit CU. Responsive to this monitoring data, the transmission control unit CU generates a transmission signal Vs containing the control data CD needed to indicate the operating status of the load and transmits the transmission signal Vs to the operation terminal 1. In response to this transmission signal Vs, the operation terminal 1 turns on or off a light-emitting unit that indicates the operating status of the load. The light-emitting unit includes a light-emitting element (not shown) such as a light-emitting diode or the like and a light guide portion 41 made of a transparent material and exposed to the front surface of the operation terminal 1 as shown in FIGS. 30 through 32. The light generated from the light-emitting element is projected frontwards through the light guide portion 41.

Some of the operation terminals 1 have a single light-emitting unit (a single light guide portion 41) for one control switch (one push button handle portion 51) as illustrated in FIG. 30. Others have two light-emitting units (two light guide portions 41) for one control switch (one push button handle portion 51) as illustrated in FIGS. 31 and 32.

The two light-emitting units are differently operated to emit light. For example, one of the two light-emitting units (e.g., the upper one in FIG. 31 or the right one in FIG. 32) emits light when the load is in an on-state, while the other (e.g., the lower one in FIG. 31 or the left one in FIG. 32) emits light when the load is in an off-state.

On the front surface of the operation terminal 1 shown in FIG. 31 or 32, there is provided a signal input window 62*b* through which an optical signal is inputted from an address setting device (not shown) for setting addresses of the control switches.

In case where two light-emitting units are provided as shown in FIGS. 31 and 32, it is typical that the light-emitting units are operated in different colors. For example, the light-emitting unit energized in the on-state of the load is designed to emit red light, while the light-emitting unit energized in the off-state of the load is designed to emit green light. However, it is sometimes the case that one who suffers from color blindness has a difficulty in discerning the light colors. In particular, if the two light-emitting units (two light guide portions 41) corresponding to the same control switch (the same push button handle portion 51) are arranged adjacent to each other as shown in FIG. 31, it is much more difficult for the color-blind person to discern the operating status of the load.

This problem is ameliorated if the two light-emitting units (the two light guide portions 41) corresponding to the same control switch (the same push button handle portion 51) are spaced apart from each other as shown in FIG. 32. Since the four control switches and the light-emitting units corresponding thereto are all arranged one above another along the vertical direction in the example shown in FIG. 32, it is difficult to figure out the correspondence relationship between the control switches and the light-emitting units. In other words, it is difficult to determine at a glance whether each of the light-emitting units interposed between the control switches (the push button handle portions 51), e.g., the second light-emitting unit (the second light guide portion 41) counted from the top in FIG. 32, corresponds to the upper control switch or the lower control switch.

In case that a plurality of light guide portions 41 are used for the operation terminal 1 as shown in FIGS. 31 and 32, if each light guide portion 41 is configured as separate part, manufacturing cost is raised due to increased number of parts.

The above mentioned address setting device is capable of setting four addresses of the control switch at once. Accordingly, if the addresses of operation terminal 1 having eight control switches are made to be set by optical signals from the address setting device above, there is required two light-receiving unit in each control switch 4 because each four control switches 4 is required one light-receiving unit. In this case, if an optical signal targeting one light-receiving unit is received by the other light-receiving unit, an address is set to unintended control switch.

SUMMARY OF THE INVENTION

In view of the afore-mentioned problems, it is an object of the present invention to provide an operation terminal capable of giving enhanced visibility to a color-blind person and making it easy to figure out the correspondence relationship between light-emitting units and control switches.

Further, it is another object of the present invention to provide an operation terminal capable of reducing manufacturing cost thereof.

Moreover, it is still another object of the present invention to provide an operation terminal capable of suppressing wrong optical signal.

In accordance with an embodiment of the invention, there is provided an operation terminal for use in a remote monitoring and control system which includes an operation terminal including a plurality of control switches each having a push button handle portion arranged to receive a pressing force applied from the front side thereof, each of the control switches having a specific address set in the operation terminal, a control terminal connected to a load having a specific address set in the control terminal, and a transmission control unit for sending and receiving a transmission signal by a time-multiplexed transmission method to and from the operation terminal and the control terminal via signal lines, generating load control data based on monitoring data sent from the operation terminal when each of the control switches is operated, and sending the control data to the control terminal connected to the load which is associated with the operated control switch by predetermined relational data. The operation terminal includes: a communication unit connected to the signal lines and configured to send monitoring data to the transmission control unit; an operation terminal control unit for, when the push button handle portion of one of the control switches is pushed, generating monitoring data which contains information on the address allotted to the pushed one of the control switches and controlling the communication unit to send the monitoring data to the transmission control unit; a plurality of on-period light-emitting units provided in a one-to-one correspondence to the control switches and controlled by the operation terminal control unit to emit light when the load associated with the corresponding one of the control switches by relational data is in an on-state; a plurality of off-period light-emitting units provided in a one-to-one correspondence to the control switches and controlled by the operation terminal control unit to emit light when the load associated with the corresponding one of the control switches by relational data is in an off-state; and a housing for accommodating the operation terminal control unit and holding the control switches, the communication unit, the on-period light-emitting units and the on-period light-emitting units in place, the housing being fixed to an installation surface, wherein at least one half of the control switches are arranged one above another in a vertical direction and each of the on-period light-emitting units is arranged in such a fashion as to transversely interpose the corresponding one of the control switches between itself and the corresponding one of the off-period light-emitting units when seen from the front side.

With the invention noted above, it is possible to increase the distance between the on-period light-emitting units and the off-period light-emitting units as compared to a case where the on-period and off-period light-emitting units would be arranged on the same side of the control switches. Since there is no need to discern the on-period and off-period light-emitting units by the colors of light, it is possible to give enhanced visibility to a color-blind person. Furthermore, it becomes easy to figure out the correspondence relationship between the light-emitting units and the control switches as compared to a case where the control switches and the light-emitting units corresponding thereto would be arranged one above another in the vertical direction.

Preferably, each of the on-period light-emitting units and the off-period light-emitting units has a front surface protrudes forwards beyond a front surface of the push button handle portion.

With the invention noted above, the light-emitting units can prevent erroneous operation of the control switches which would otherwise occur when the control switches are inadvertently pressed from their front sides by an object greater in size than the push button handle portions.

It is preferable that the control switches are eight in number and are arranged in four rows and in two columns.

With the invention noted above, it is possible to increase the distance between the control switches and to thereby restrain erroneous operation of the control switches as compared to a case where the control switches would be arranged in eight rows and in a single column.

In accordance with another embodiment of the invention, there is provided an operation terminal for use in a remote monitoring and control system including an operation terminal including one or more control switches each having a push button handle portion arranged to receive a pressing force applied from the front side thereof, each of the control switches having a specific address set in the operation terminal, a control terminal connected to a load having a specific address set in the control terminal, and a transmission control unit for sending and receiving a transmission signal by a time-multiplexed transmission method to and from the operation terminal and the control terminal via signal lines, generating load control data based on monitoring data sent from the operation terminal when each of the control switches is operated, and sending the control data to the control terminal connected to the load which is associated with the operated control switch by predetermined relational data. The operation terminal includes: a communication unit connected to the signal lines and configured to send monitoring data to the transmission control unit; a plurality of light-emitting units provided in a pair to each of the control switches and configured to emit light to indicate operating status of the load associated with the corresponding one of the control switches by relational data; an operation terminal control unit for, when the push button handle portion of one of the control switches is pushed, generating monitoring data which contains information on the address allotted to the pushed one of the control switches, the operation terminal control unit controlling the communication unit to send the monitoring data to the transmission control unit and controlling each of the light-emitting units; and a housing for accommodating the operation terminal control unit and holding the control switches, the communication unit and the light-emitting units in place, the housing being fixed to an installation surface, wherein each of the light-emitting unit includes a light-emitting element for emitting light under the control of the operation terminal control unit and a light guide portion for guiding the light from the light-emitting element frontwards, and the light guide portions are provided in one or more light guide members formed of a transparent material.

With the invention noted above, it is possible to reduce the manufacturing cost due to decreased number of parts as compared to a case where the light guide portions are separately configured in each light-emitting unit.

Preferably, each of the light guide members includes an engagement portion engaged with the housing, so that it is held in place with respect to the housing by the engagement of the engagement portion.

With the invention noted above, the manufacturability is enhanced as compared to a case where each light guide member is attached to the housing by ultrasonic welding.

It is preferable that the control switches are eight in number and are arranged in four rows and in two columns, and the light guide portions of the four light-emitting units corresponding to two control switches arranged in a same row are provided in each of the light guide members.

With the invention noted above, the operation terminal having the control switches arranged in four rows one above another and the housing may be jointly used.

Preferably, the operation further includes: a decoration cover removably attached to the housing to cover at least a part of the front surface of the housing when seen from the front side; and at least one name card holding portion for holding a name card having information on each of the control switch in place, the name card holding portion being provided in the housing.

With the invention noted above, when the decoration cover is removed, the name card is not easily detached from the name card holding portion as compared to a case where each name card holding portion is prepared in each decoration cover.

It is preferred that the operation terminal further includes: a decoration cover removably attached to the housing to cover at least a part of the front surface of the housing when seen from the front side; and at least one name card holding portion for holding a name card having information on each of the control switches in place, the name card holding portion being provided in each of the light guide members.

With the invention noted above, when the decoration cover is removed, the name card is not easily detached from the name card holding portion as compared to a case where each name card holding portion is prepared in each decoration cover.

In accordance with still another embodiment of the invention, there is provided an operation terminal for use in a remote monitoring and control system which includes an operation terminal including a plurality of control switches each having a push button handle portion arranged to receive a pressing force applied from the front side thereof, each of the control switches having a specific address set in the operation terminal, a control terminal connected to a load having a specific address set in the control terminal, and a transmission control unit for sending and receiving a transmission signal by a time-multiplexed transmission method to and from the operation terminal and the control terminal via signal lines, generating load control data based on monitoring data sent from the operation terminal when each of the control switches is operated, and sending the control data to the control terminal connected to the load which is associated with the operated control switch by predetermined relational data. The operation terminal includes: a communication unit connected to the signal lines and configured to send monitoring data to the transmission control unit; two light receiving units each receiving an optical signal indicative of the address of each of the control switches, each of the light receiving units having a light-receiving element for converting the optical signal to an electric signal; an operation terminal control unit for, when the light receiving unit receives an optical signal indicative of the address of any one of the control switches, setting the address of the corresponding control switch in accordance with the optical signal and for, when the push button handle portion of one of the control switches is pushed, generating monitoring data which contains information on the address allotted to the pushed one of the control switches, the operation terminal control unit controlling the communication unit to send the monitoring data to the transmission control unit; and a housing for accommodating the light receiving units and the operation terminal control unit and holding the control switches and the communication unit in place, the housing being fixed to an installation surface, wherein the optical signal is incident on each of the light-receiving elements of the light receiving units through two signal windows provided correspondingly to the light receiving units in the housing, and a signal barrier wall for preventing the optical signal coming through one of the signal windows from being incident on the light-receiving element of the light receiving unit corresponding to the other signal window.

With the invention noted above, the transmittance of wrong optical signal to the light-receiving element of the light-receiving is suppressed by the signal barrier wall.

Preferably, the operation terminal further includes: at least one push button handle member including a plurality of the push button handle portions which are formed of a synthetic resin in a single body.

With the invention noted above, the manufacturing cost is reduced owing to the reduced number of parts as compared to a case that each push button handle member having single push button handle portion is prepared in each control switch.

It is preferred that the operation terminal further includes: one or more light-emitting units provided to each of the control switches and controlled by the operation terminal control unit to indicate operating status of the load associated with the corresponding one of the control switches by relational data, the light-emitting units being held in place by the housing, wherein each of the light-emitting units has a light-emitting element for emitting light under the control of the operation terminal control unit and a light guide portion through which the light from the light-emitting element is projected frontwards, and the push button handle member has at least one partition wall disposed between the light-emitting element and the light guide portion of the adjacent light-emitting units, the partition wall serving to prevent the light from the light-emitting element from being incident on the light guide portion.

With the invention noted above, unintended display of light through wrong light guide portion of another light-emitting unit from the light-emitting element of the light-emitting unit is suppressed as compared to a case where no partition wall is provided.

BRIEF DESCRIPTION OF THE DRAWINGS

The objects and features of the present invention will become apparent from the following description of embodiments given in conjunction with the accompanying drawings, in which.

DETAILED DESCRIPTION OF THE PREFERRED EMBODIMENTS

Hereinafter, an embodiment of the present invention will be described with reference to the accompanying drawings.

Figure 1:
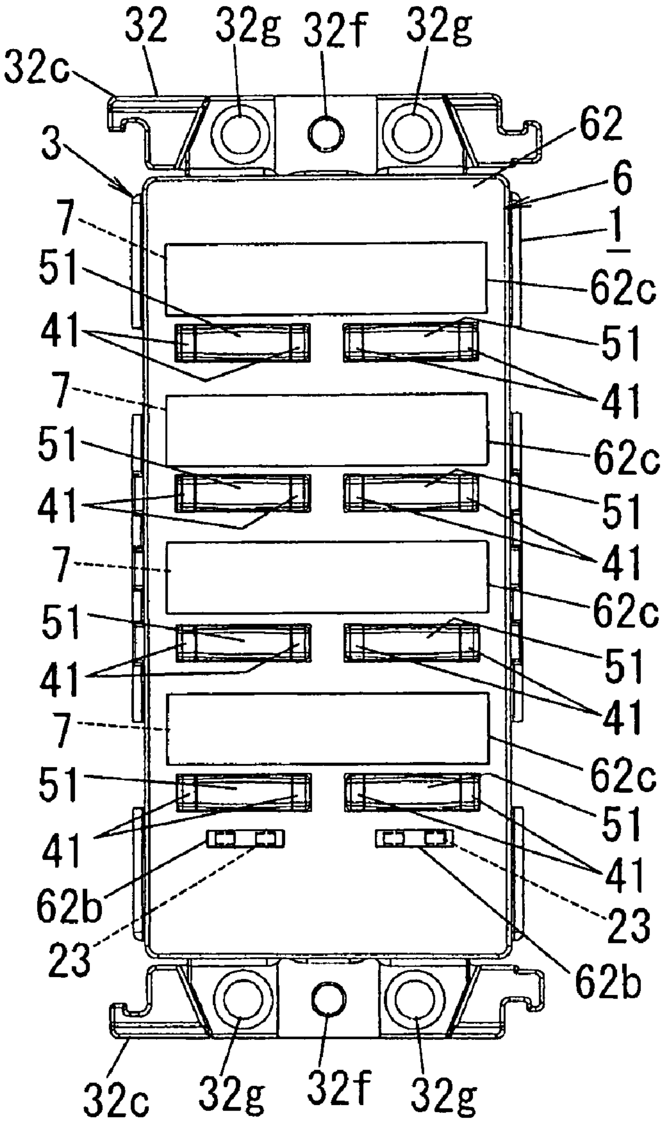
FIG. 1 is a front view showing an operation terminal in accordance with one embodiment of the present invention.
Figure 2:
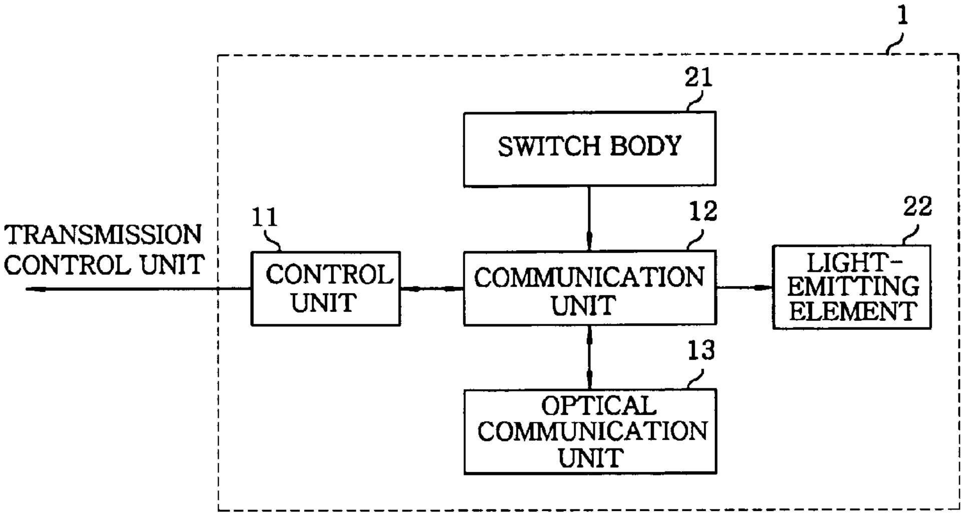
FIG. 2 is a block diagram illustrating the schematic configuration of the present operation terminal.

The present embodiment is directed to an operation terminal 1 connected to the signal lines Ls of the remote monitoring and control system which has been described earlier with reference to FIGS. 28 and 29A through 29C. As shown in FIGS. 1 through 4, the operation terminal 1 includes: a communication unit 11 connected to the signal lines Ls for receiving a transmission signal Vs or sending an interrupt signal Vi and monitoring data; eight switch bodies 21 (only one of which is shown in FIG. 2) each formed of a push button switch and allotted an individual address, each of the switch bodies 21 constituting a control switch in combination with the corresponding one of the push button handle portions 51 described below; sixteen light-emitting elements 22 (only one of which is shown in FIG. 2) each formed of, e.g., a light-emitting diode, the light-emitting elements 22 being provided in a pair in each of the switch bodies 21, each of the light-emitting elements 22 constituting a light-emitting unit in combination with the corresponding one of the light guide portions 41 described below, each of the light-emitting elements 22 being designed to use their light-emitting states to indicate the operating status of a load associated with the corresponding one of the switch bodies 21 by virtue of relational data; and a control unit 12 for controlling the communication unit 11 and the light-emitting elements 22 in response to the transmission signal Vs sent to the communication unit 11 and the operation input to the switch bodies 21, respectively.

The operation terminal 1 of the present embodiment further includes two optical communication units 13 (only one of which is shown in FIG. 2) that send and receive, e.g., an infrared-based optical signal, to and from an address setting device (not shown) for setting an address of each of the switch bodies 21. The control unit 12 includes a memory (not shown) for storing the address of each of the switch bodies 21. When the optical communication units 13 receive an optical signal indicative of the address of each of the switch bodies 21, the control unit 12 rewrites the address of each of the switch bodies 21 stored in the memory according to the optical signal. In other words, the address of each of the switch bodies 21 is set in the control unit 12 according to the optical signal sent to the optical communication units 13. The optical communication units 13 constitutes a light-receiving units defined in the claims.

Figure 3:
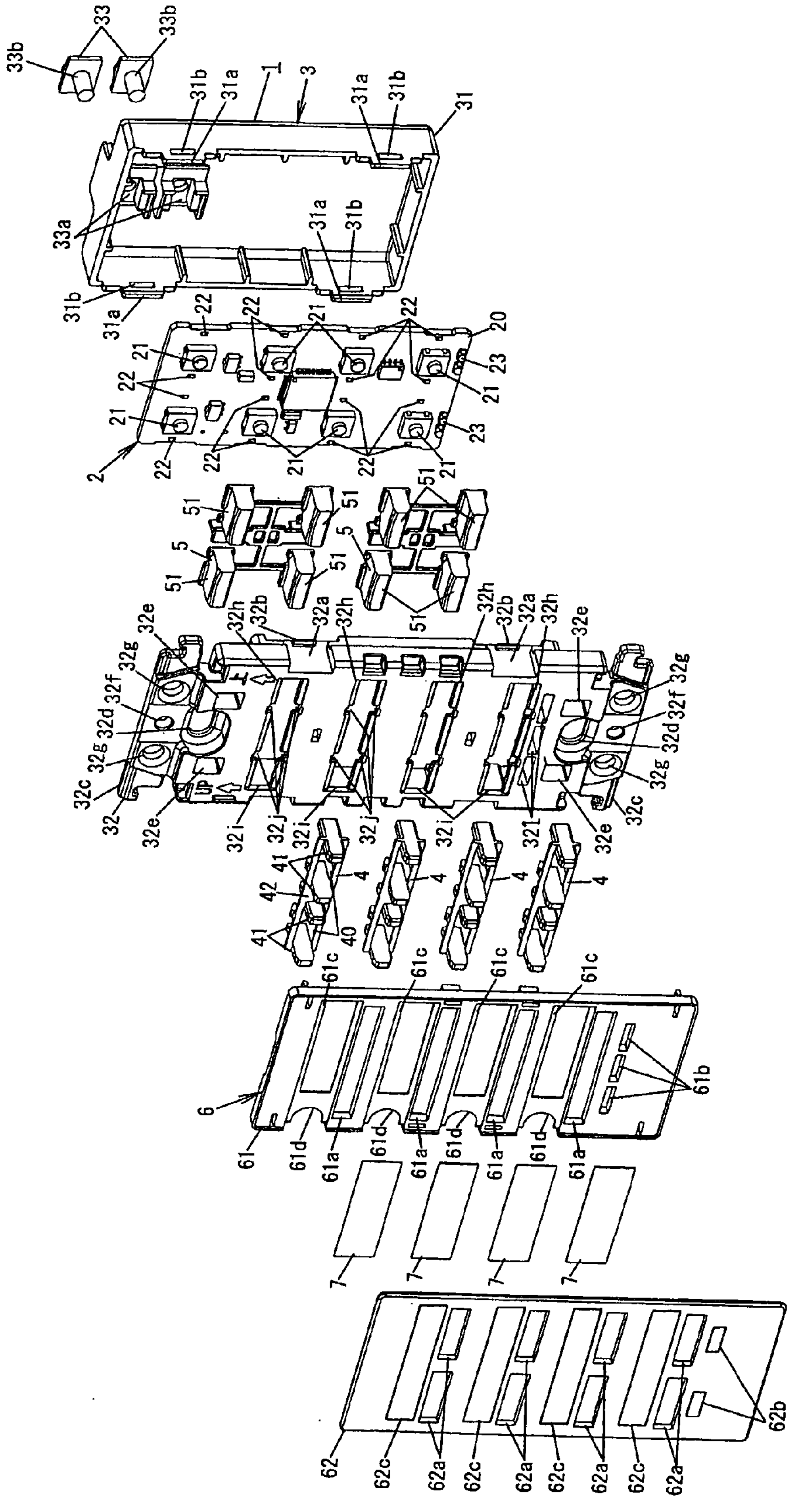
FIG. 3 is an exploded perspective view showing the present operation terminal.

The respective circuit parts of the communication unit 11, the optical communication units 13 and the control unit 12, the switch bodies 21 and the light-emitting elements 22 are mounted to a printed circuit board 20 shown in FIG. 3, thus forming a circuit block 2. In the following description, the up-and-down direction in FIG. 3 will be referred to as a "vertical direction." The direction extending between the left upper portion and the right lower portion in FIG. 3 will be referred to as a "transverse direction." The direction extending between the left lower portion and the right upper portion in FIG. 3 will be referred to as a "back-and-forth direction." In other words, the back-and-forth direction refers to the thickness direction of the printed circuit board 20.

The switch bodies 21 are arranged in four rows along the vertical direction and in two columns along the transverse direction.

Each of the optical communication units 13 includes: a light receiving and emitting unit 23 having a light-emitting element for sending, e.g., an infrared-based optical signal, and a light-receiving element for converting the optical signal to an electric signal, the light-emitting element and the light-receiving element being arranged side by side in the transverse direction; a drive circuit (not shown) for driving the light-emitting element; and a signal processing circuit (not shown) for signal processing such as amplification or noise removal of the output of the light-receiving element. The optical communication units 13 are available in the art, the details of which will therefore be omitted from illustration and description. Two light receiving and emitting units 23 are arranged below the switch bodies 21 along the transverse direction. Each of the light receiving and emitting units 23 is positioned below each column of the four switch bodies 21. In this regard, the address setting device is designed to set the addresses of four control switches at a time. The addresses of four switch bodies 21 arranged above each of the light receiving and emitting units 23 are set by the optical signal inputted to each of the light receiving and emitting units 23.

Two of the light-emitting elements 22 corresponding to each of the switch bodies 21 are arranged to transversely interpose the corresponding one of the switch bodies 21 therebetween. The two light-emitting elements 22 have different light colors. For example, the light-emitting element 22 arranged at the left side of each of the switch bodies 21 has a green light color, while the light-emitting element 22 arranged at the right side of each of the switch bodies 21 has a red light color. The control unit 12 controls the light-emitting elements 22 in such a manner that the right one of the light-emitting elements 22 corresponding to each of the switch bodies 21 is turned on but the left one is turned off during the time period when the load associated with each of the switch bodies 21 by relational data is in an on-state, while the right one of the light-emitting elements 22 is turned off but the left one is turned on during the time period when the load is in an off-state. The right one of the light-emitting elements 22 and one of the below-mentioned light guide portions 41 constitute an on-period light-emitting unit defined in the claims. The left one of the light-emitting elements 22 and one of the below-mentioned light guide portions 41 constitute an off-period light-emitting unit defined in the claims.

The communication unit 11 and the control unit 12 are available in the art, the details of which will therefore be omitted from illustration and description.

Figure 4:
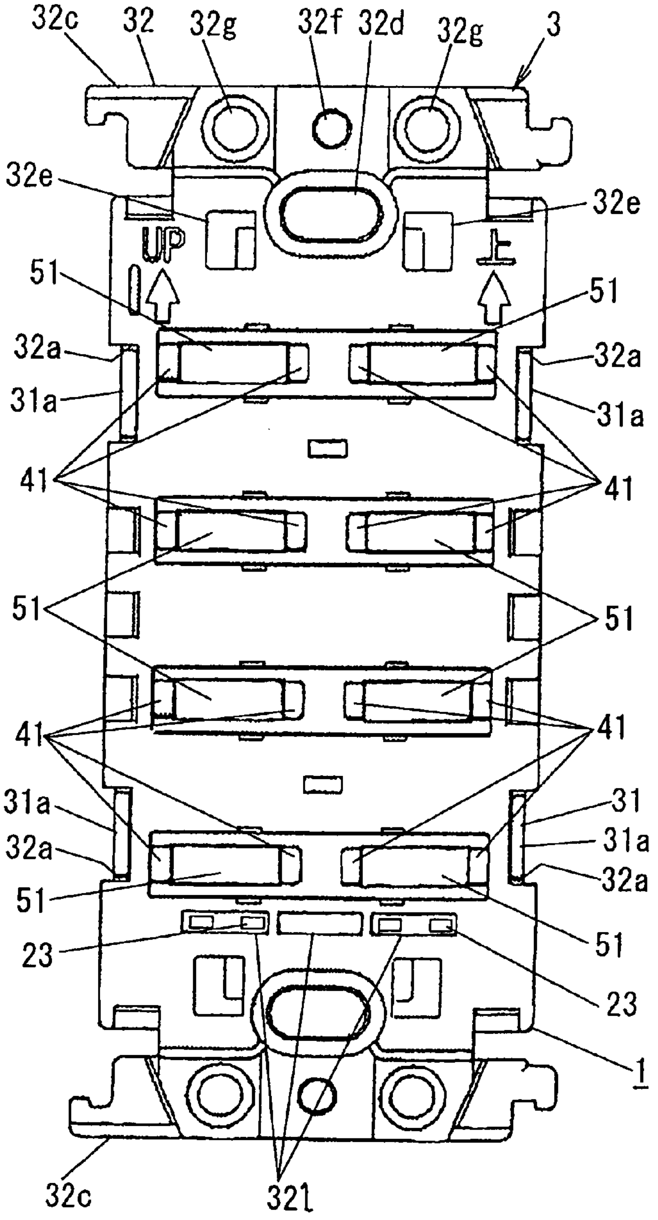
FIG. 4 is a front view showing the present operation terminal, with a decoration cover removed for clarity.

As shown in FIG. 4, the operation terminal 1 of the present embodiment includes a housing 3 to accommodate the printed circuit board 20. The housing 3 includes a rectangular body 31 opened at its front side and a flat cover 32 mechanically coupled to the body 31 in such a fashion as to close the front opening of the body 31. The body 31 and the cover 32 are formed of, e.g., synthetic resin molded products.

The body 31 has forwardly-protruding coupling pieces 31*a* arranged one above another in the left and right walls thereof. Each of the coupling pieces 31*a* has a vertically-elongated transversely-penetrating coupling hole 31*b* formed in the rear end portion thereof. The cover 32 has coupling grooves 32*a* formed on the left and right side surfaces and opened forwards and backwards. On the bottom surface of each of the coupling grooves 32*a*, there is formed a vertically-elongated coupling claw 32*b* that protrudes outwards in the transverse direction. Each of the coupling pieces 31*a* is inserted into the corresponding one of the coupling grooves 32*a*, while the coupling claw 32*b* is engaged with the coupling hole 31*b*. Thus the body 31 and the cover 32 are mechanically coupled together.

A pair of screw terminals 33 is held in place in the upper end portion of the back surface of the body 31. Each of the signal lines Ls is connected to the corresponding one of the screw terminals 33 from the rear side of the latter. Electric wires (not shown) connected to the communication unit 11 at one ends thereof are connected to the front sides of the screw terminals 33. In other words, the communication unit 11 is connected to the signal lines Ls through the electric wires and the screw terminals 33. Each of the screw terminals 33 includes a terminal plate 33*a* provided with a thread hole penetrating in the back-and-forth direction and attached to the body 31 as by press-fitting and a terminal screw 33*b* provided with a flange for pinching the signal lines Ls between itself and the terminal plate 33*a* and threadedly coupled to the thread hole of the terminal plate 33*a*.

The cover 32 is integrally formed with an existing interchangeable mounting frame of large square type under JIS C 8304. More specifically, the cover 32 is provided at its upper and lower ends with attachment portions 32*c* protruding outwards beyond the body 31 in the vertical direction. The attachment portions 32*c* are used in fixing the housing 3 to an installation surface (not shown) such as a wall surface or the like. In the center region of each of the attachment portions 32*c*, a transversely-elongated box hole 32*d* is pierced in the back-and-forth direction so that a box screw can be inserted through the box hole 32*d* and threadedly coupled to a built-in box (not shown) embedded under the installation surface. At the left and right sides of the box hole 32*d* of the attachment portions 32*c*, hook holes 32*e* are pierced in the back-and-forth direction so that hook members (not shown) can be locked in the hook holes 32*e*. In case where the installation surface is formed of a panel, the hook members serve to pinch the hook member installed between the panel and the attachment portions 32*c*. In the region of each of the attachment portions 32*c* positioned vertically outwards of the box hole 32*d* A, a plate hole 32*f* is pierced in the back-and-forth direction so that a screw can pass through the plate hole 32*f* to fix a plate (not shown) in place. At the left and right sides of the plate hole 32*f* of each of the attachment portions 32*c*, direct attachment holes 32*g* are pierced so that direct attachment screws can pass through the direct attachment holes 32*g* and can be threadedly coupled to the installation surface.

Figure 5:
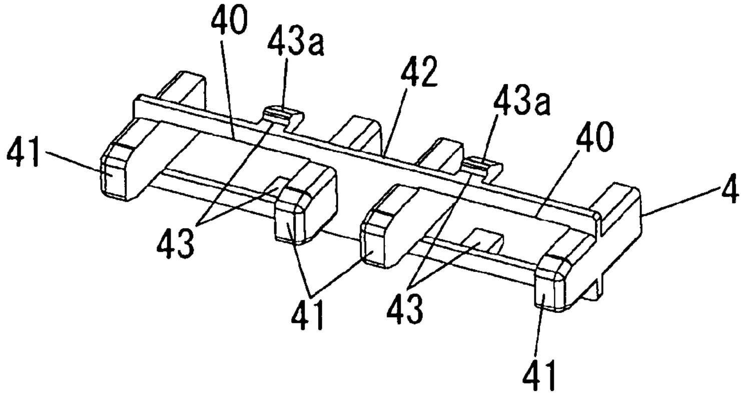
FIG. 5 is a perspective view showing a light guide member employed in the present operation terminal.

Four transparent elastic light guide members 4 made of a synthetic resin are arranged one above another in the cover 32 and are held in place. As shown in FIG. 5, each of the light guide members 4 includes four light guide portions 41 arranged along the transverse direction and positioned in front of the light-emitting elements 22 to project the light of the light-emitting elements 22 forwards and a flat body portion 42 arranged to interconnect the light guide portions 41, a thickness direction of the flat body portion 42 being in the back-and-forth direction. In the respective light guide members 4, each of the light guide portions 41 protrudes forwards and backwards from the body portion 42. The body portion 42 protrudes upwards and downwards from the light guide portions 41. On the front surface of the cover 32, four transversely-elongated rectangular recess portions 32*h* are arranged one above another so that they can accommodate the body portions 42 of the light guide members 4. On the bottom surface of each of the recess portions 32*h*, a through-hole 32*i* is pierced in the back-and-forth direction so that each of the light guide portions 41 can penetrate therethrough. Each of the light guide members 4 further includes four engagement portions 43, two of which protrude backwards from the upper extension of the body portion 42 and the remaining two of which protrude backwards from the lower extension of the body portion 42. Each of the engagement portions 43 has a hooking claw 43*a* protruding outwards in the vertical direction. Furthermore, each of the engagement portions 43 has a slanting surface extending backwards and inwards in the vertical direction from the hooking claw 43*a*. Hooking grooves 32*j* opened forwards and backwards are formed at four places on the inner peripheral surface of the through-hole 32*i* in a corresponding relationship with the engagement portions 43.

Figure 6:
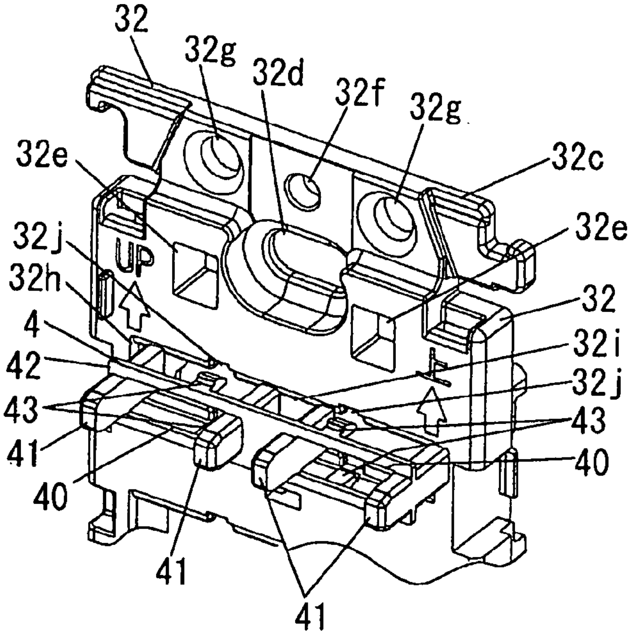
FIG. 6 is a perspective view showing a light guide member and a cover employed in the present operation terminal.
Figure 7:
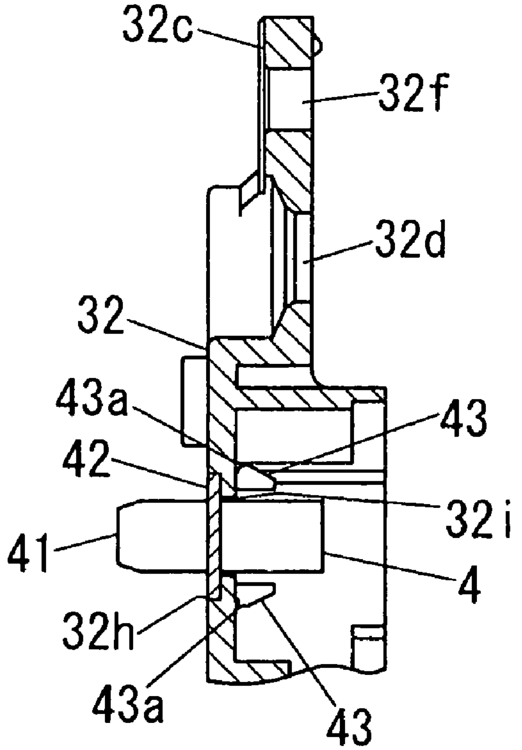
FIG. 7 is a section view showing the light guide member attached to the cover in the present operation terminal.

In order to attach each of the light guide members 4 to the cover 32, the body portion 42 is pushed into each of the recess portions 32*h* in such a manner that the hooking claws 43*a* are inserted into the hooking grooves 32*j* as shown in FIG. 6. At this time, the slanting surface of each of the engagement portions 43 makes sliding contact with the inner surface of each of the hooking grooves 32*j*, thereby elastically deforming each of the engagement portions 43 so that the rear end thereof can move downwards. If each of the hooking claws 43*a* arrives at the rear of the rear opening surface of the through-hole 32*i*, each of the engagement portions 43 are elastically restored to its original state as shown in FIG. 7. Thus each of hooking claws 43*a* moves into the backside of the cover 32. In other words, the engagement portions 43 come into engagement with the cover 32 (i.e., the housing 3). In this state, the displacement of each of the light guide members 4 toward the front side of the cover 32 is prevented by the engagement portions 43 thus engaged. The displacement of each of the light guide members 4 toward the rear side of the cover 32 is prevented by the body portion 42 making contact with the bottom surface of each of the recess portions 32*h*. As a result, the light guide members 4 are kept in place with respect to the cover 32. In addition, the vertical and transverse displacement (looseness) of each of the light guide members 4 relative to the cover 32 is prevented by the body portion 42 making contact with the inner peripheral surface of each of the recess portions 32*h* and by the engagement portions 43 abutting to the inner surfaces of the hooking grooves 32*j*. In the present embodiment, since each of the light guide members is held in place with respect to the housing by the engagement, the manufacturability is enhanced as compared to the case where each light guide member 4 is attached to the housing 3 by ultrasonic welding.

With the above configuration, since each of the transparent light guide members has a plurality of light guide portions, the manufacturing cost can be decreased owing to the reduced number of parts as compared to the case where each light guide portion is provided for each light-emitting unit (each light-emitting element 22).

Figure 8A:
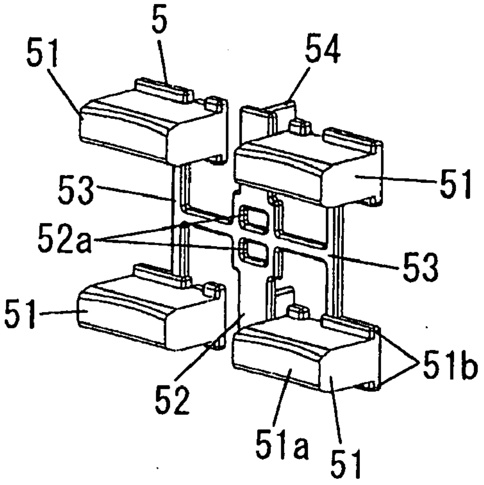
FIG. 8A is a front perspective view showing a push button handle portion employed in the present operation terminal and FIG. 8B is a rear perspective view showing the push button handle portion.
Figure 8B:
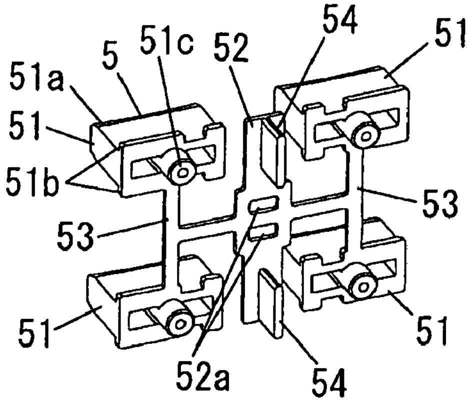

Two push button handle members 5 are arranged one above the other in the cover 32 and are held in place. Each of the push button handle members 5 includes four push button handle portions 51 positioned in front of the switch bodies 21 so that they can deliver a pushing force applied from the front side to the push buttons of the switch bodies 21. Each of the push button handle members 5 is made of an elastic material, e.g., a synthetic resin. As shown in FIGS. 8A and 8B, each of the push button handle members 5 includes a body portion 52 kept fixed with respect to the cover 32 and two spring portions 53 protruding toward the left and right sides of the body portion 52. Each of the spring portions 53 supports two of the push button handle portions 51 so that they can be displaced forwards and backwards relative to the body portion 52. The upper push button handle member 5 corresponds to the four switch bodies 21 of upper two rows, while the lower push button handle member 5 corresponds to the four switch bodies 21 of lower two rows.

Figure 9:
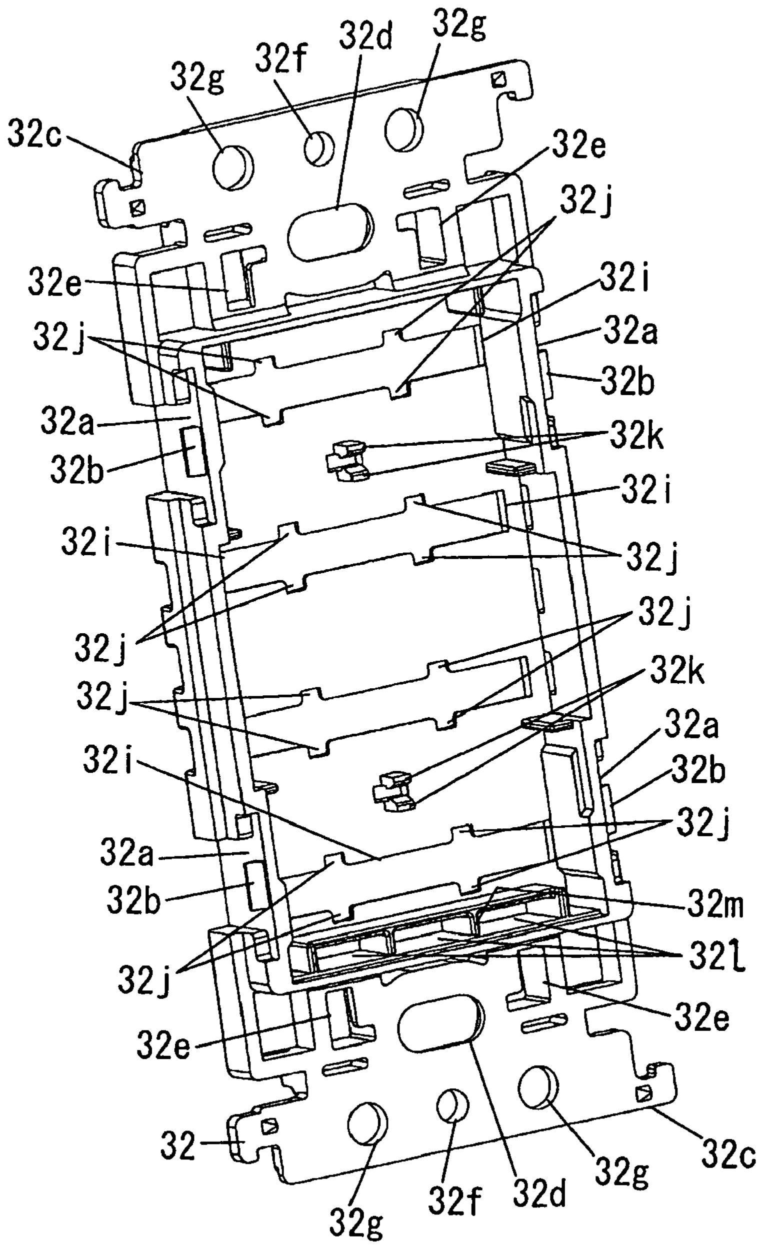
FIG. 9 is a perspective view showing a cover employed in the present operation terminal.
Figure 10:
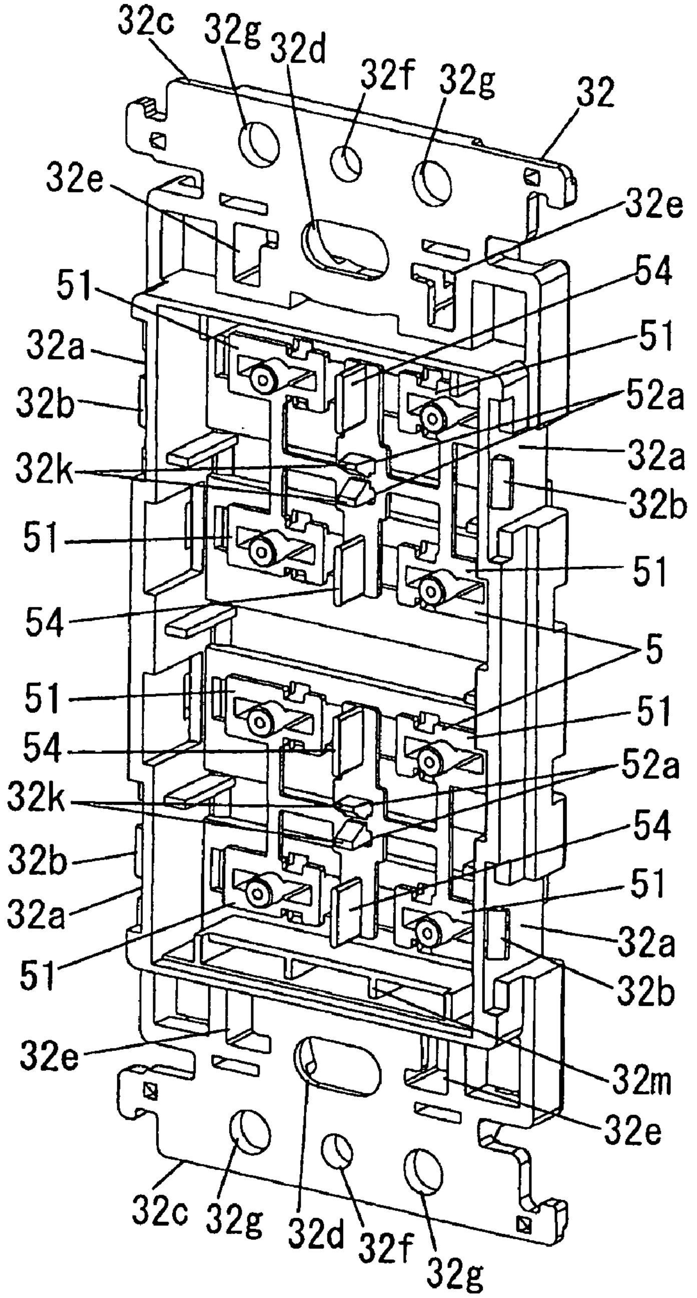
FIG. 10 is a perspective view showing a state in which the push button handle portion is attached to the cover in the present operation terminal.

In the central region of the body portion 52 of each of the push button handle members 5, two engagement holes 52*a* lying one above the other are pierced in the back-and-forth direction. As shown in FIG. 9, two backwardly-protruding engagement lugs 32*k* are formed on the rear surface of the cover 32 in alignment with the engagement holes 52*a* of each of the push button handle members 5. Each of the push button handle members 5 is fixed to the cover 32 by inserting the engagement lugs 32*k* into the engagement holes 52*a* and bringing the engagement lugs 32*k* into engagement with the main body portion 52 as shown in FIG. 10.

Figure 11:
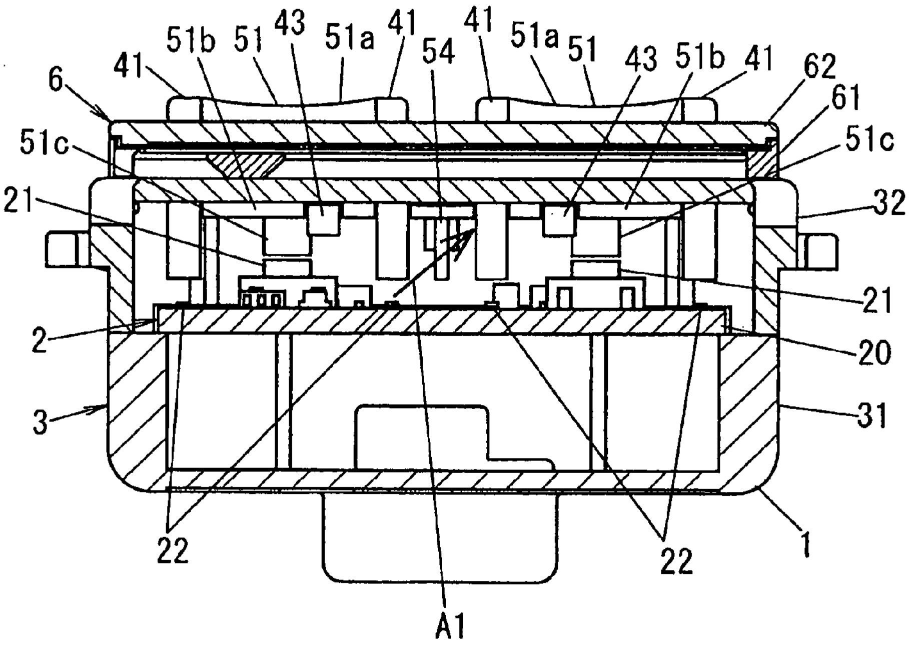
FIG. 11 is a section view showing the present operation terminal.

The body portion 52 of each of the push button handle members 5 extends upwards and downwards up to the positions where it is interposed between the left and right push button handle portions 51 when seen from the front side (namely, the positions where it is interposed between the two light guide portions 41 centrally arranged along the transverse direction). Indication-assisting partition walls 54 protrude from the upper and lower end portions of the rear surface of the body portion 52. Each of the partition walls 54 has a rear end protruding backwards beyond the rear ends of the light guide portions 41. In this regard, if the light emitted from one of the two centrally-arranged light-emitting elements 22 is incident on the light guide portion 41 lying in front of the other light-emitting element 22 as indicated by an arrow A1 in FIG. 11, the light guide portion 41 is seen as if it emits light. This may lead to a misunderstanding that the other light-emitting element 22 is emitting light. According to the present embodiment, the undesired incidence of the light on the neighboring light guide portion 41 is restrained by the partition wall 54. This reduces the possibility of misunderstanding as mentioned above.

Figure 12:
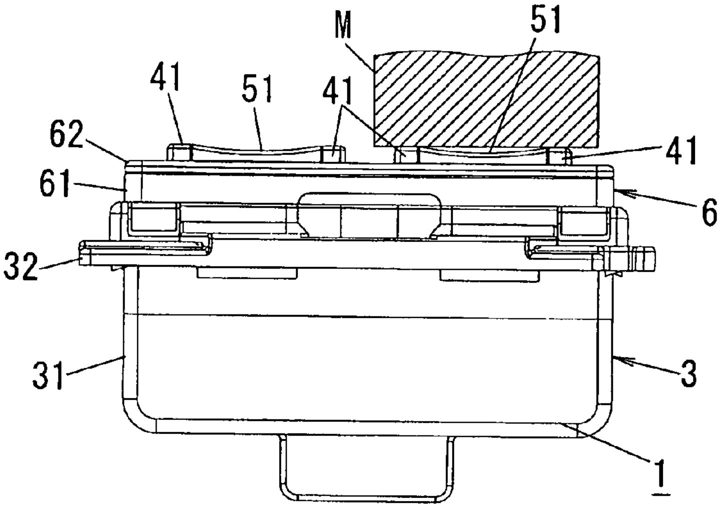
FIG. 12 is a bottom view showing the present operation terminal.

Each of the push button handle portions 51 has a transversely-elongated rectangular shape when seen from the front side. Each of the push button handle portions 51 includes a push button body 51*a* whose front surface protrudes forwards beyond the front surfaces of the body portion 52 and the spring portions 53, collar portions 51*b* protruding upwards and downwards from the rear end portion of the push button body 51*a*, and a pressing portion 51*c* protruding backwards from the central region of the rear surface of the push button body 51*a* in an opposing relationship with the push button of each of the switch bodies 21. If the front surface of the push button body 51*a* is pushed to elastically deform the spring portion 53 and to displace the push button handle portion 51 backwards, the push button of each of the switch bodies 21 is pressed by the rear surface of the pressing portion 51*c*. Each of the light guide members 4 has two push button insertion holes 40 pierced in the back-and-forth direction. The push button body 51*a* of each of the push button handle portions 51 is inserted through the corresponding one of the push button insertion holes 40 from the rear side thereof. The push button body 51*a* penetrates through the through-hole 32*h* of the cover 32 and the push button insertion hole 40 of each of the light guide members 4 so that the front surface thereof can protrude forwards beyond the front surface of the housing 3. Each of the collar portions 51*b* has a cutout that allows the engagement portion 43 of each of the light guide members 4 to pass therethrough. The front surface of the push button body 51*a* (i.e., the front surface of each of the push button handle portions 51) is curved in such a shape that the transverse central region thereof is depressed backwards from the transverse opposite end regions. When each of the push button handle portions 51 is not pushed from the front side and each of the spring portions 53 is not elastically deformed, the front surface of each of the light guide portions 41 is generally flush with the left and right end regions of the front surface of each of the push button handle portions 51 as shown in FIG. 12. In other words, the front surface of each of the light guide portions 41 is positioned forwards of the front surface of each of the push button handle portions 51. Therefore, even if each of the push button handle portions 51 is pressed from its front side by an object M, e.g., a piece of furniture, greater in size than the push button handle portions 51, the object M comes into contact with the light guide portions 41 against any further backward movement. This eliminates the possibility that the object M presses each of the push button handle portions 51, thereby preventing the object M from erroneously operating each of the push button handle members 5. The opposing side surfaces of the push button handle portions 51 and the light guide portions 41 are parallel to the back-and-forth direction in which the push button handle portions 51 are displaced relative to the housing 3. The distance between two of the light guide portions 41 interposing the push button insertion hole 40 therebetween is a little greater than the transverse size of the push button body 51*a* of each of the push button handle portions 51. In the present embodiment, each of the push button handle portions 51 is interposed between the inner surfaces of the through-hole 32*h* in the vertical direction and between the light guide portions 41 in the transverse direction. Thus each of the push button handle portions 51 is guided so that it can make sliding movement relative to the housing 3 in the back-and-forth direction. This restrains looseness of the push button handle portions 51 as compared to a case where the front ends of the light guide portions 41 would be positioned backwards of the front ends of the push button handle portions 51 while the latter is not pushed.

In the lower end region of the cover 32, three transversely-elongated rectangular window holes 32*l* are pierced in the back-and-forth direction and are arranged side by side in the transverse direction. The middle one of the window holes 32*l* is positioned at the transverse center of the cover 32, while the left and right ones of the window holes 32*l* are positioned below the respective columns of the four push button handle portions 51 arranged one above another. The left one of the light receiving and emitting units 23 is positioned at the rear of the left window hole 32*l*, while the right one of the light receiving and emitting units 23 is positioned at the rear of the right window hole 32*l*. An optical signal is incident on each of the light receiving and emitting units 23 through the corresponding one of the window holes 32*l* provided in front thereof. In other words, the left and right opposing two window holes 32*l* constitute the signal windows defined in the claims. Signal barrier walls 32*m* protrude backwards from the peripheral edges of the window holes 32*l*. Use of these signal barrier walls 32*m* eliminates the possibility that the optical signal coming through, e.g., the left window hole 32*l*, is incident on the right light receiving and emitting unit 23.

A rectangular decoration cover 6 for covering the upper and lower box holes 32*d* when seen from the front side is removably attached to the front surface of the housing 3. The decoration cover 6 includes a cover body 61 attached to the front surface of the cover 32 and a front cover 62 removably coupled to the front surface of the cover body 61 in such a fashion as to cover the cover body 61 when seen from the front side. The cover body 61 and the front cover 62 are formed of, e.g., synthetic resin molded products. Coupling of the cover body 61 to the cover 32 and coupling of the front cover 62 to the cover body 61 can be effectuated by a coupling method well-known in the art, e.g., a male-female coupling method.

The decoration cover 6 will be described in more detail. In the cover body 61, four rectangular through-holes 61*a*, each communicating with the corresponding one of the through-holes 32*i* of the cover 32, are pierced in the back-and-forth direction and are arranged one above another. Below the lowermost one of the through-holes 61*a*, three rectangular window holes 61*b*, each communicating with the corresponding one of the window holes 32*l* of the cover 32, are pierced in the back-and-forth direction and are arranged along the transverse direction. In the front cover 62, eight rectangular through-holes 62*a* are pierced in the back-and-forth direction and are arranged in four rows and two columns. Each of the through-holes 62*a* communicates with the corresponding one of the through-holes 61*a* of the cover body 61. The body portion 51*a* of each of the push button handle portions 51 and two of the light guide portions 41 are inserted into each of the through-holes 62*a*. When the decoration cover 6 is attached to the housing 3, the push button handle portions 51 and the light guide portions 41 protrude forwards beyond the front surface of the decoration cover 6 through the through-holes 61*a* of the cover body 61 and the through-holes 62*a* of the front cover 62. At two places of the front cover 62 in front of the left and right window holes 61*b* of the cover body 61, signal window portions 62*b* made of a transparent material are provided so that the optical signal inputted to or outputted from the light receiving and emitting units 23 can pass therethrough. The task of setting an address with the address setting device is performed in a state that the optical communication unit (not shown) of the address setting device is pressed against one of the signal window portions 62*b* of the front cover 62 corresponding to the switch body 21 (or the control switch) for which an address is to be set.

Rectangular sheet-shaped name cards 7 are held in place by the decoration cover 6. Written in the name cards 7 is the information on the load associated with each of the switch bodies 21 by relational data, i.e., the load that is controlled when the switch body 21 is pushed. The name cards 7 are formed of, e.g., a sheet of paper. In the present embodiment, the two switch bodies 21 arranged side by side in the transverse direction share one of the name cards 7, which means that the maximum number of name cards 7 is four. More specifically, card insertion slots 61*c* opened toward the left side are formed above the respective through-holes 61*a* on the front surface of the cover body 61. The name cards 7 are placed in the card insertion slots 61*c*. The card insertion slots 61*c* are covered by the front cover 62. Thus the name cards 7 are held in place by the decoration cover 6. Rectangular card window portions 62*c* made of a transparent material are provided at four places of the front cover 62 in front of the card insertion slots 61*c*. This makes it possible to observe the name cards 7 with naked eyes through the card window portions 62*c*. A semicircular cutout 61*d* opened forwards and backwards is formed in the left end portion of each of the card insertion slots 61*c*. Each of the name cards 7 can be easily removed from the card insertion slots 61*c* by holding, with a finger, the left end portion of each of the name cards 7 exposed backwards through the cutout 61*d*.

With the configuration described above, the light-emitting elements 22 forming the on-period light-emitting units and the light-emitting elements 22 forming the off-period light-emitting units are arranged at different sides, i.e., at the left and right sides, respectively. Therefore, the on-state and off-state of the load is indicated by lighting one of the light guide portions 41 arranged at the left and right sides of each of the push button handle portions 51 when seen from the front side. Thanks to this feature, it is possible to increase the distance between the light guide portions 41 as compared to a case where the light guide portions 41 indicating the on-state and the off-state would be arranged on the same side of each of the push button handle portions 51. Since there is no need to discern the on-state and the off-state by the colors of light, it is possible to give enhanced visibility to a color-blind person. In addition, it becomes easy to figure out the correspondence relationship between the light guide portions 41 and the push button handle portions 51 as compared to a case where the light guide portions 41 are arranged above or below the corresponding one of the push button handle portions 51.

Figure 30:
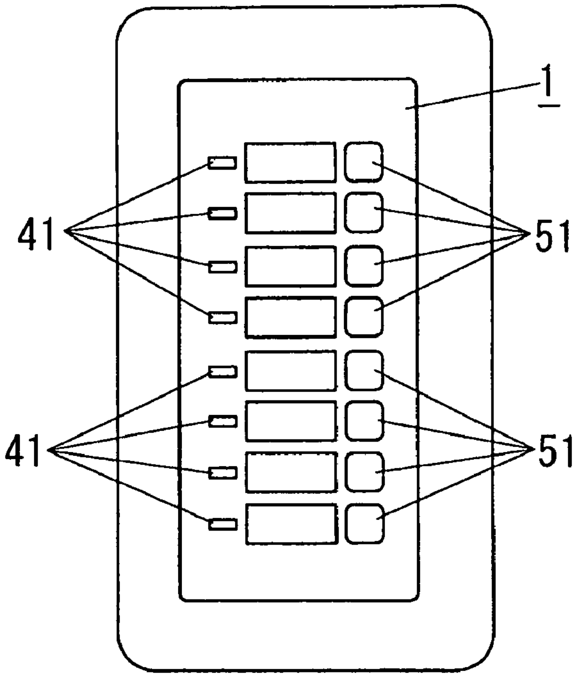
FIG. 30 is a front view illustrating one example of conventional operation terminals.
Figure 31:
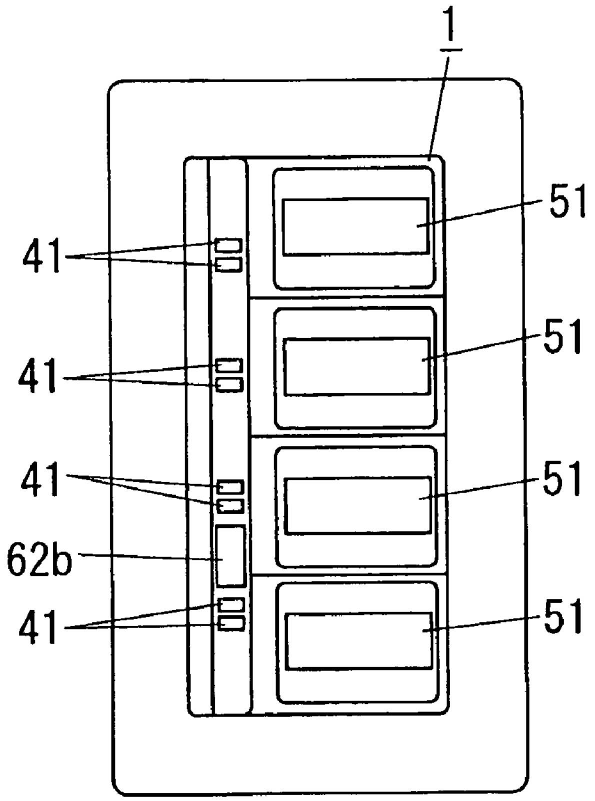
FIG. 31 is a front view illustrating another example of conventional operation terminals.
Figure 32:
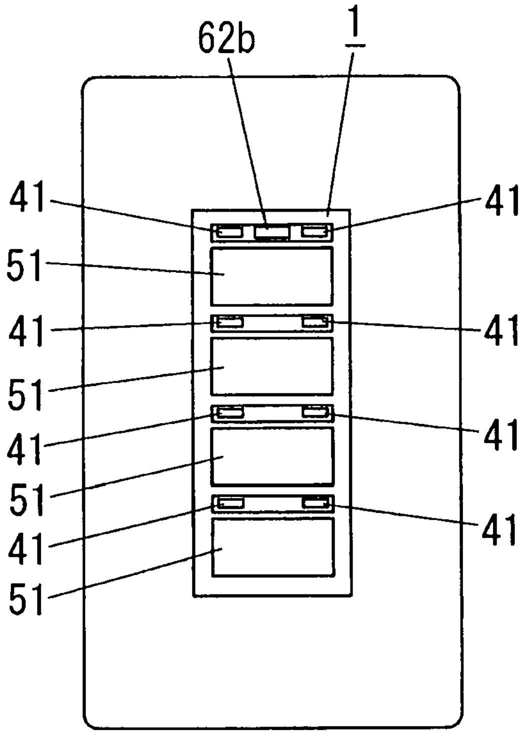
FIG. 32 is a front view illustrating a further example of conventional operation terminals.

Owing to the fact that the switch bodies 21 and the push button handle portions 51 are arranged in four rows and in two columns, it is possible to increase the distance between the push button handle portions 51 and to thereby restrain erroneous operation of the push button handle portions 51 as compared to a case where the switch bodies 21 and the push button handle portions 51 are arranged in eight rows and in a single column as in the prior art example shown in FIG. 30.

Figure 13A:
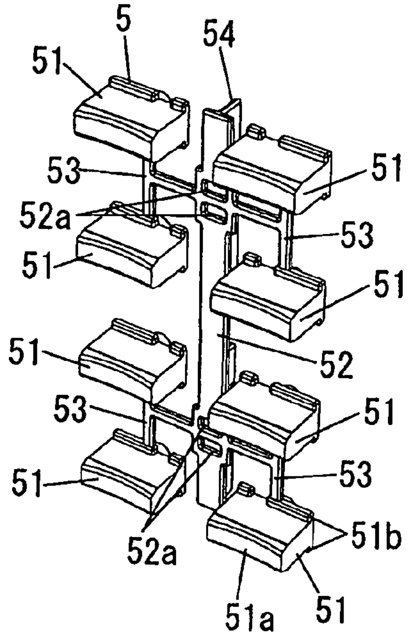
FIG. 13A is a front perspective view showing a modified example of the push button handle portion employed in the present operation terminal and FIG. 13B is a rear perspective view thereof.
Figure 13B:
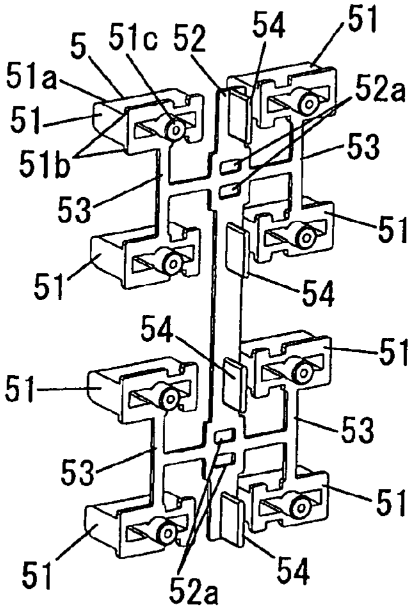
Figure 14:
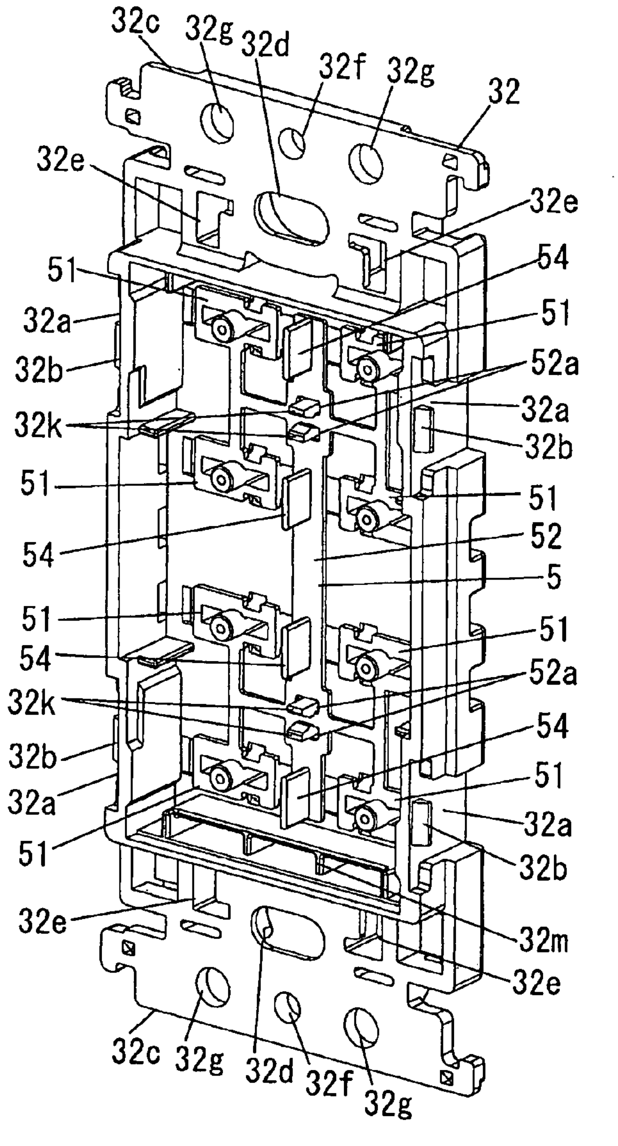
FIG. 14 is a perspective view showing a state in which the modified example of the push button handle portion shown in FIGS. 13A and 13B is attached to the cover.
Figure 15:
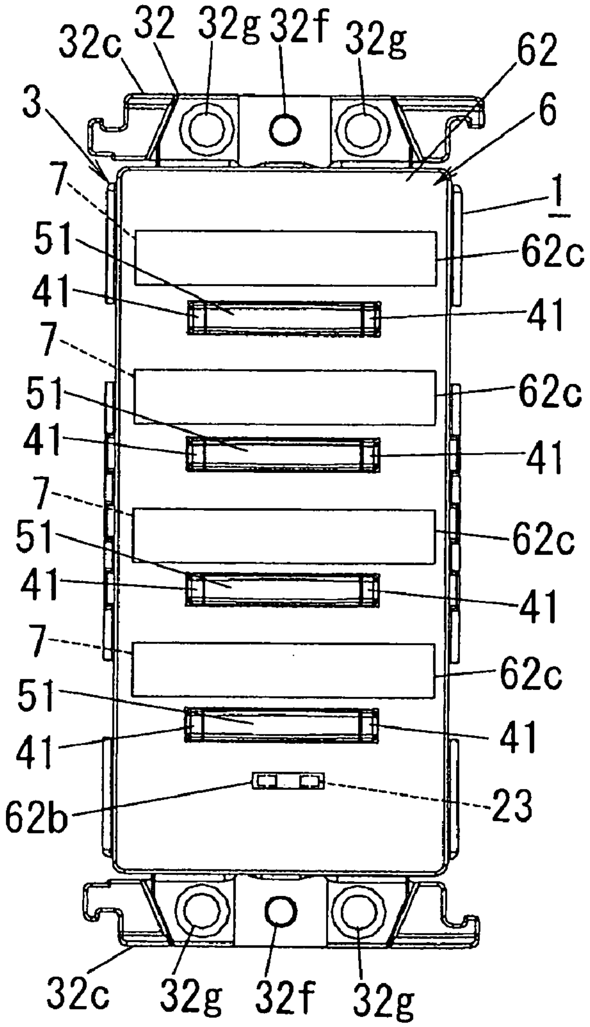
FIG. 15 is a front view illustrating another example of the present operation terminal in which four control switches are formed by using some component parts of the operation terminal.
Figure 16:
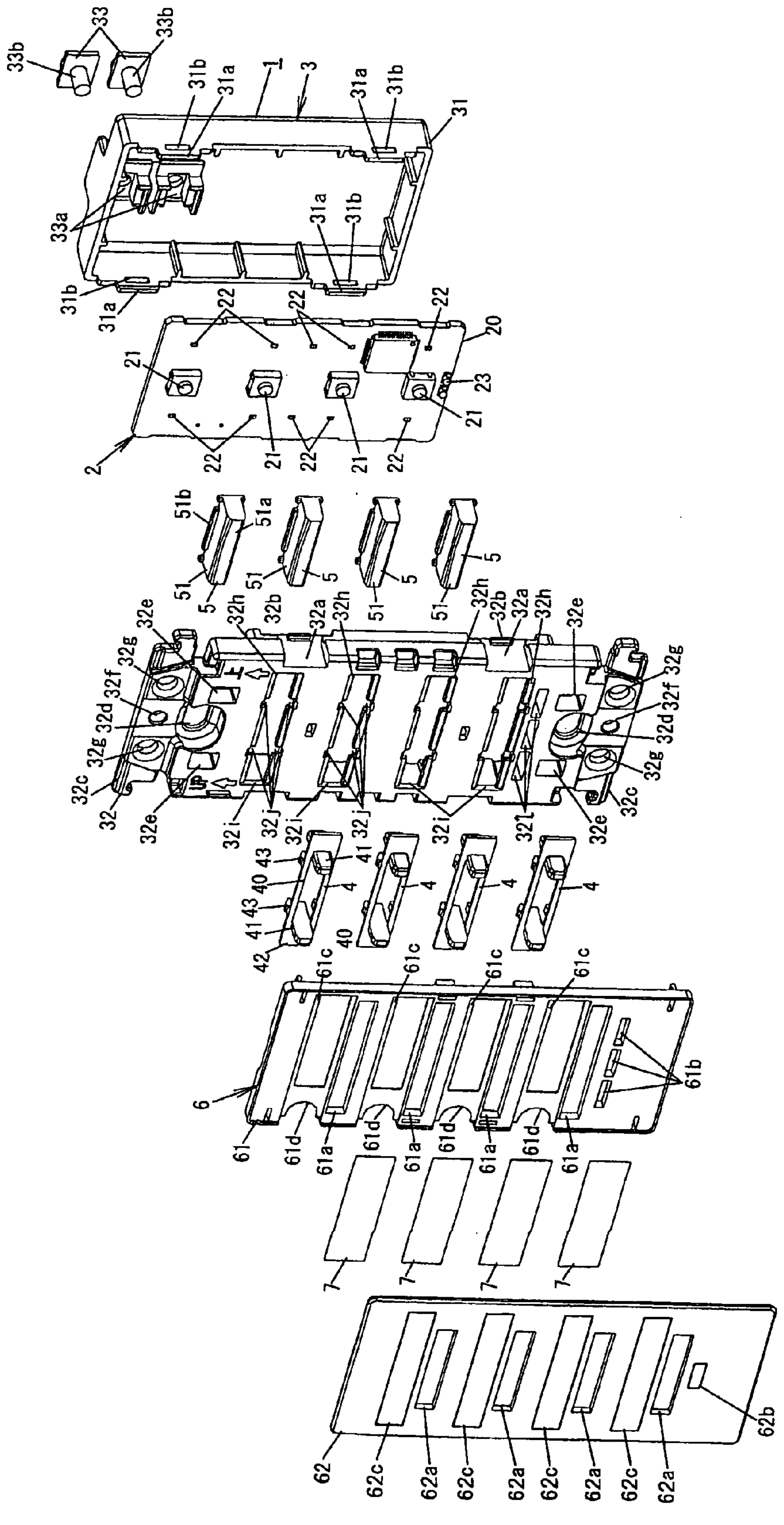
FIG. 16 is an exploded perspective view of the example of the operation terminal illustrated in FIG. 15.
Figure 17:
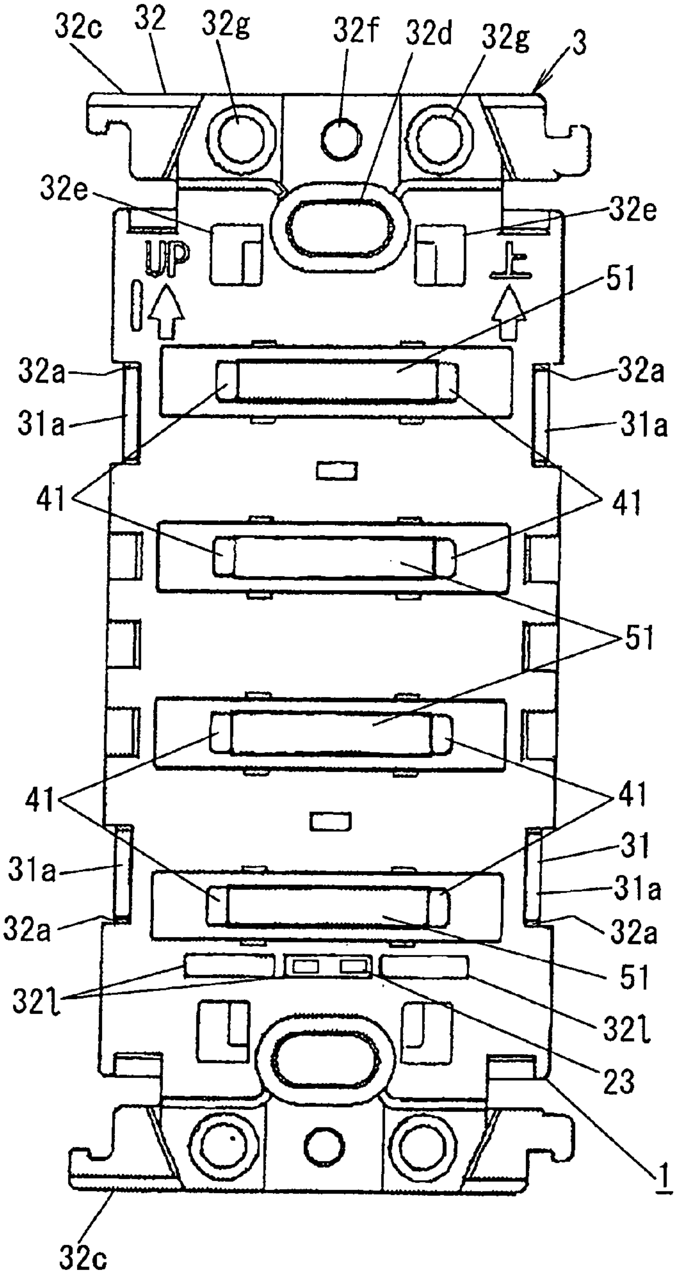
FIG. 17 is a front view of the example of the operation terminal illustrated in FIG. 15, with a decoration cover removed for clarity.
Figure 18:
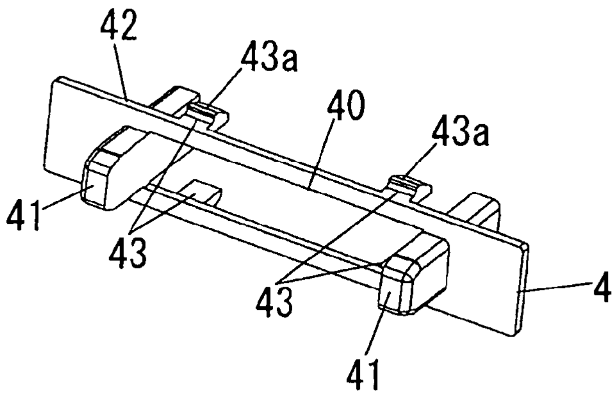
FIG. 18 is a perspective view showing a light guide member employed in the example of the operation terminal illustrated in FIG. 15.
Figure 19:
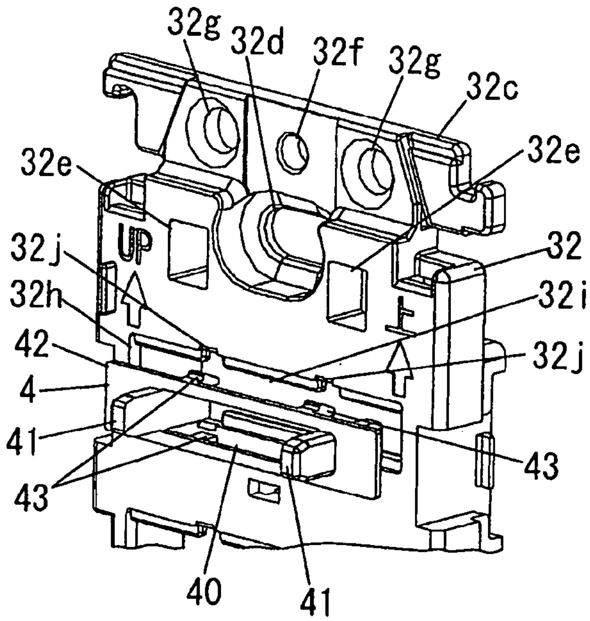
FIG. 19 is a perspective view showing a light guide member and a cover employed in the example of the operation terminal illustrated in FIG. 15.
Figure 20:
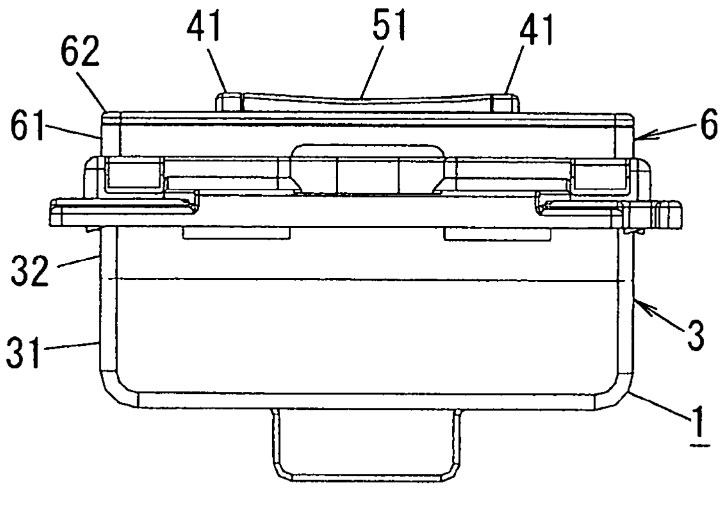
FIG. 20 is a bottom view of the example of the operation terminal illustrated in FIG. 15.

Use of the push button handle members 5 each provided with four push button handle portions 51 makes it possible to reduce the number of parts and the production cost as compared to a case where the push button handle portions 51 are produced as independent parts. Although two push button handle members 5 each provided with four push button handle portions 51 are employed in the present embodiment, it may be possible to use a single push button handle member 5 with eight push button handle portions 51 as shown in FIGS. 13A, 13B and 14. This makes it possible to further reduce the number of parts and the production cost.

Since the through-holes 32*i* and 61*a* of the cover 32 and the decoration cover 6, through which the push-button handle portions are inserted, are consecutively arranged, and the four light guide portions 41 corresponding to the push-button handle portion 51 arranged left and right side thereof are provided in a single light guide member 4, the housing 3 and the cover body 61 of the decoration cover 6 of the present embodiment may be jointly used in an operation terminal 1 that includes four control switches (i.e., four sets of switch bodies 21 and push button handle portions 51) arranged one above another as illustrated in FIGS. 15 through 20. In the example illustrated in FIGS. 15 through 20, the operation terminal 1 includes four push button handle members 5 each having a single push button handle portion 51 and four light guide members 4 each having two light guide portions 41 and one push button insertion hole 40 formed between the light guide portions 41. In the present embodiment and the example illustrated in FIGS. 15 through 20, the through-holes 32*i* of the cover 32 are closed by the light guide members 4 and the push button handle members 5.

Figure 21:
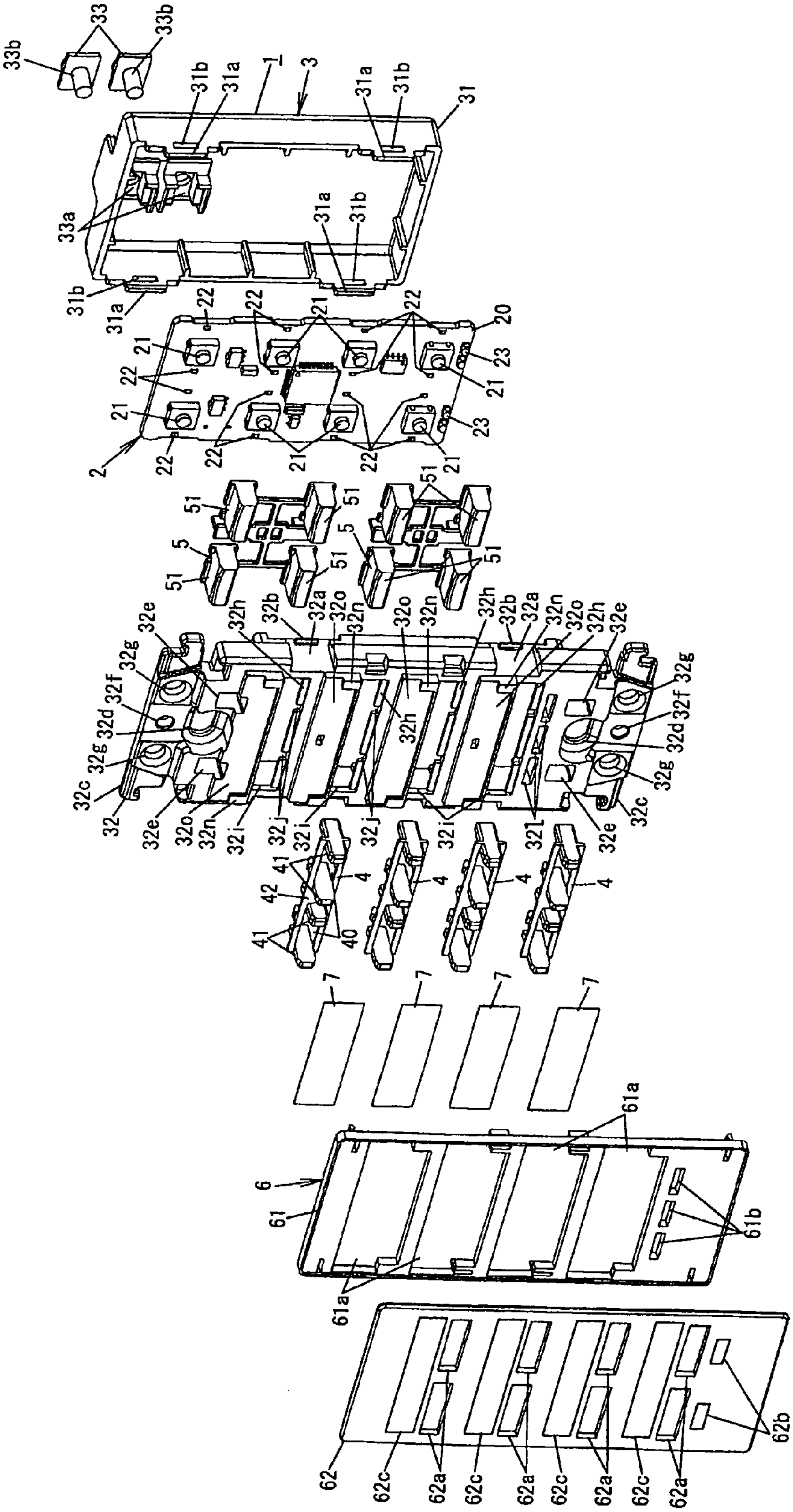
FIG. 21 is an exploded perspective view showing a modified example of the present operation terminal in which name cards are held in place by a housing.
Figure 22:
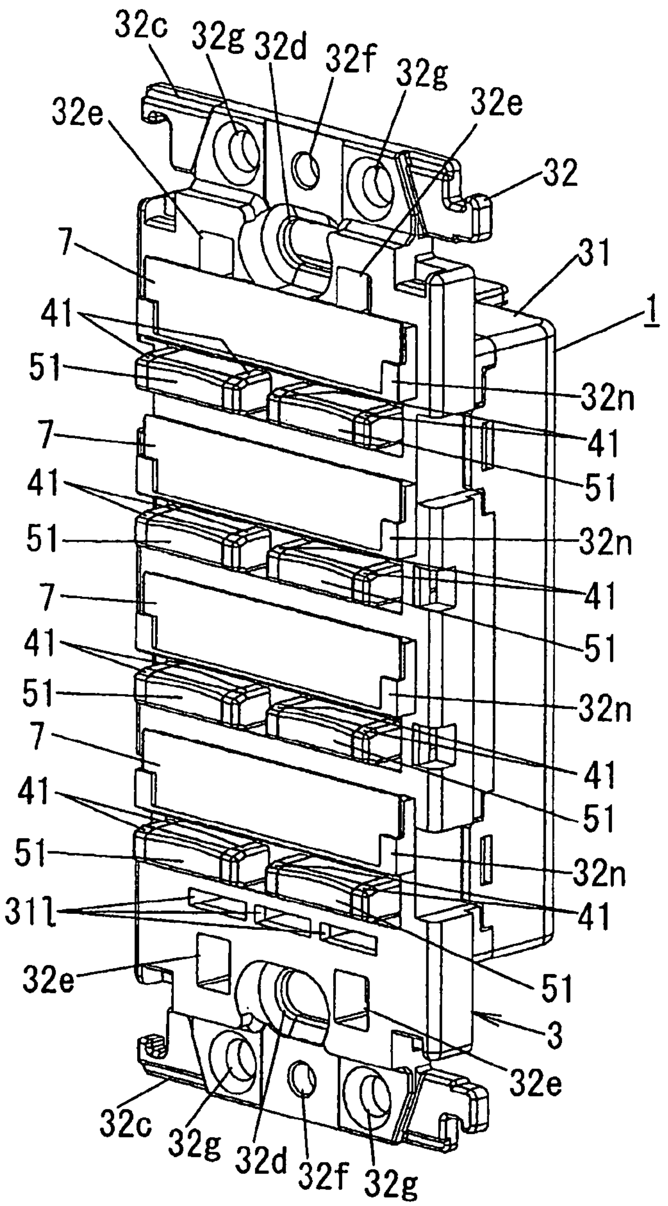
FIG. 22 is a perspective view of the example of the operation terminal shown in FIG. 21, with a decoration cover removed for clarity.
Figure 23:
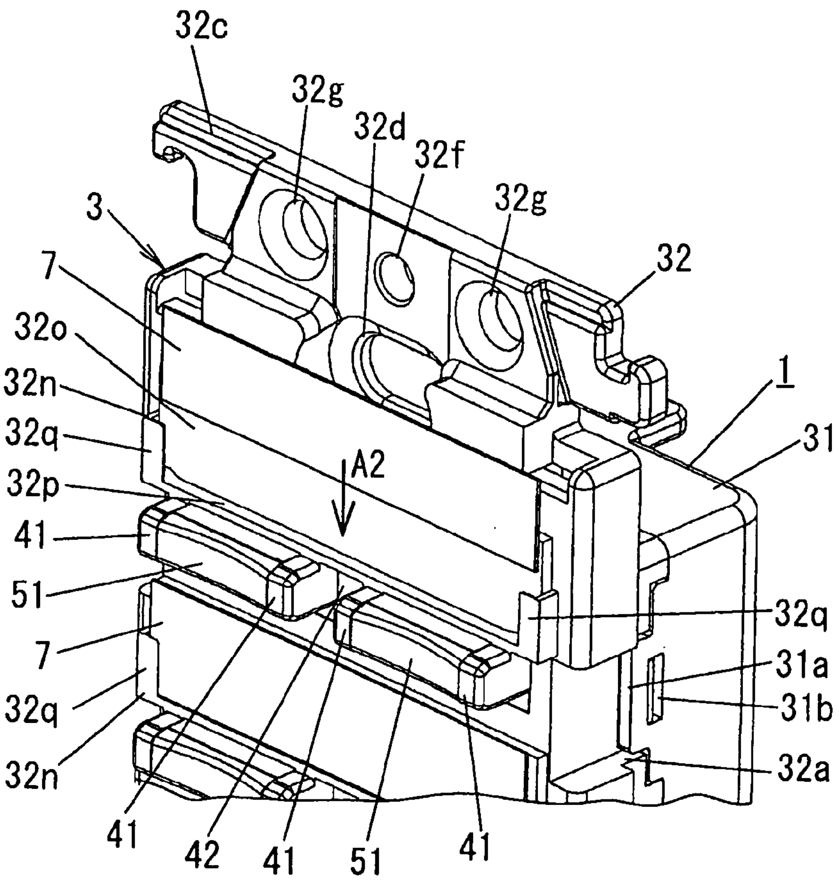
FIG. 23 is a view explaining how to hold the name cards in place in the example of the operation terminal shown in FIG. 21.
Figure 24:
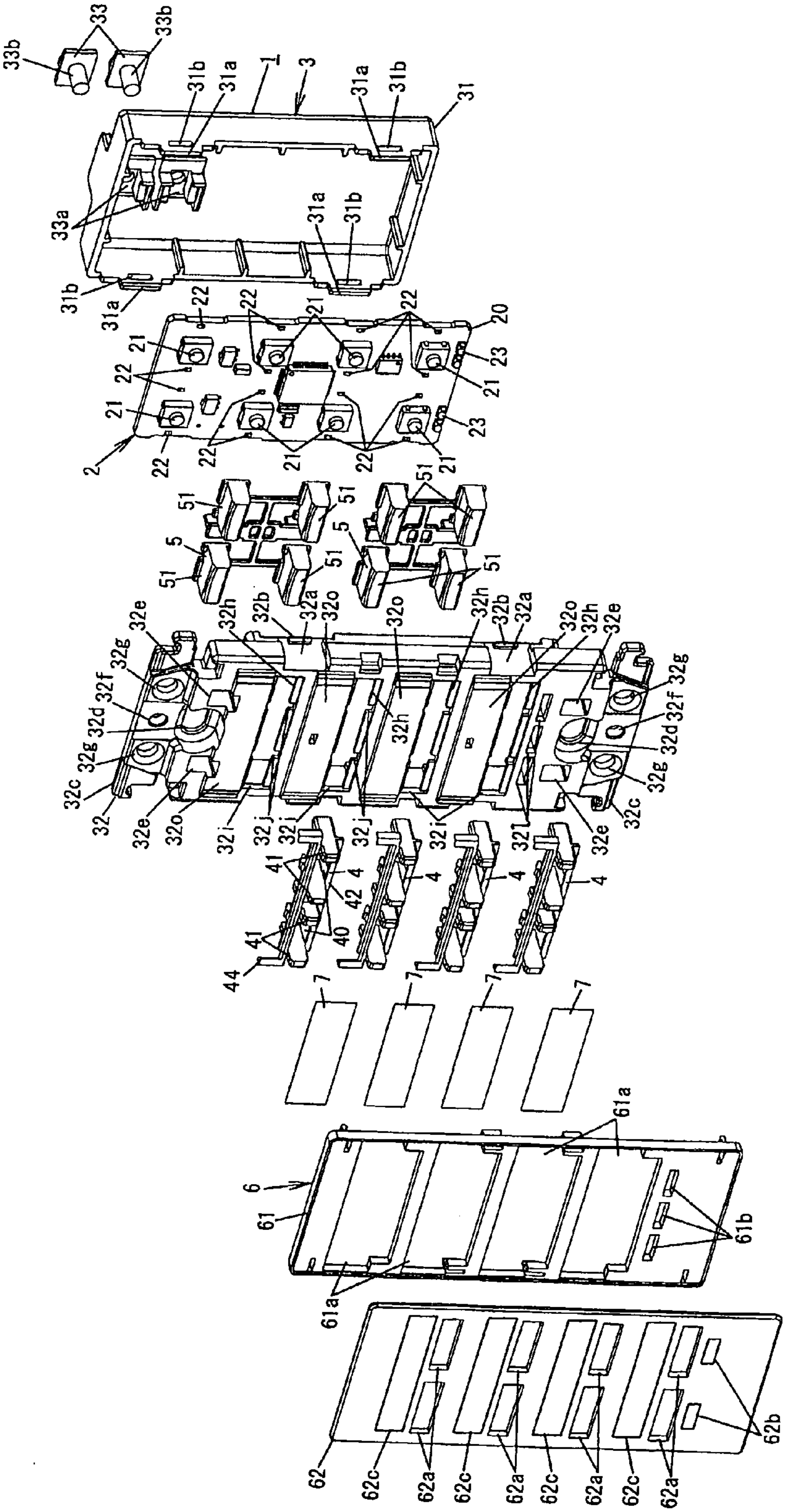
FIG. 24 is an exploded perspective view showing another modified example of the present operation terminal in which name cards are held in place by a light guide member.
Figure 25:
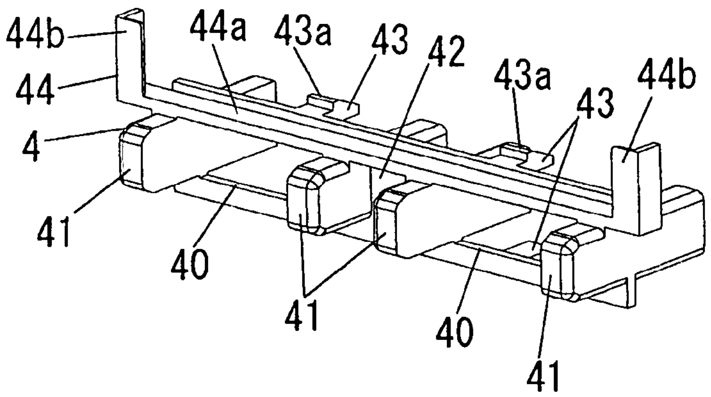
FIG. 25 is a perspective view of the light guide member employed in the example of the operation terminal shown in FIG. 24.
Figure 26:
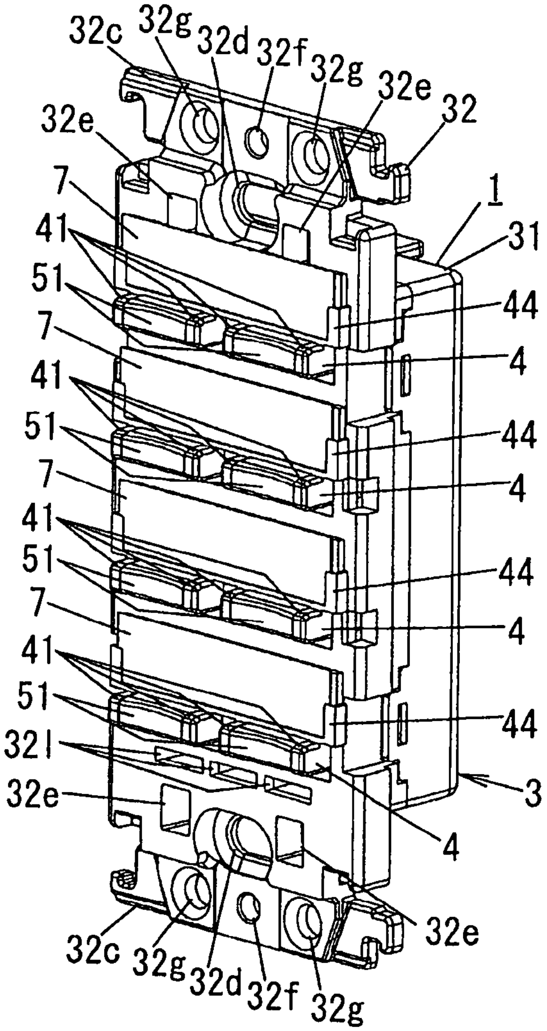
FIG. 26 is a perspective view of the example of the operation terminal shown in FIG. 24, with a decoration cover removed for clarity.
Figure 27:
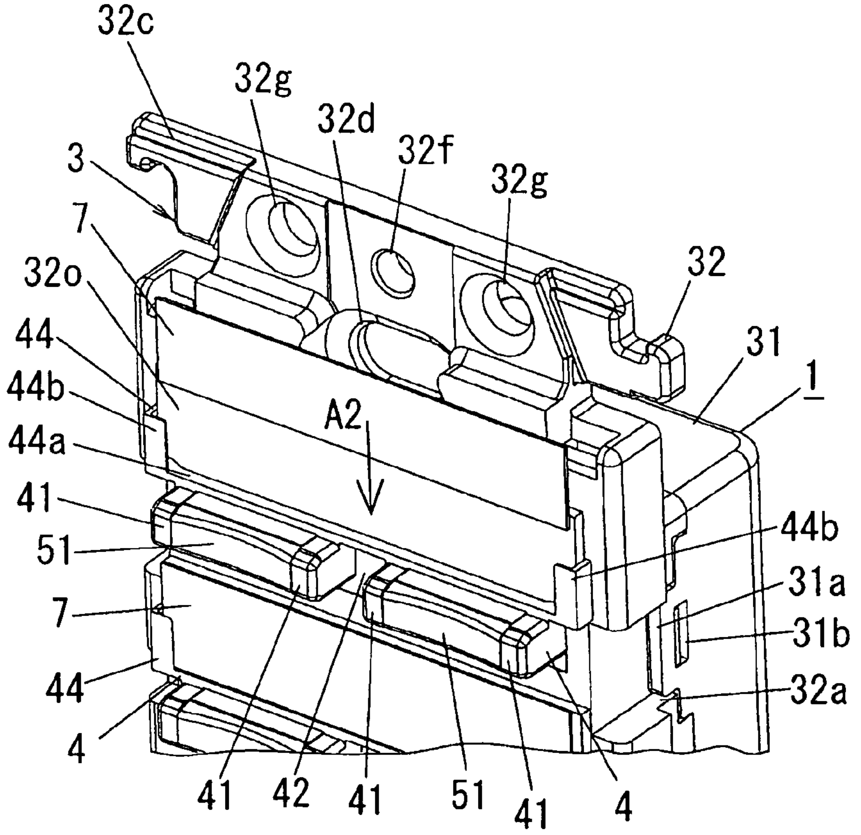
FIG. 27 is a view explaining how to hold the name cards in place in the example of the operation terminal shown in FIG. 24.
Figure 28:
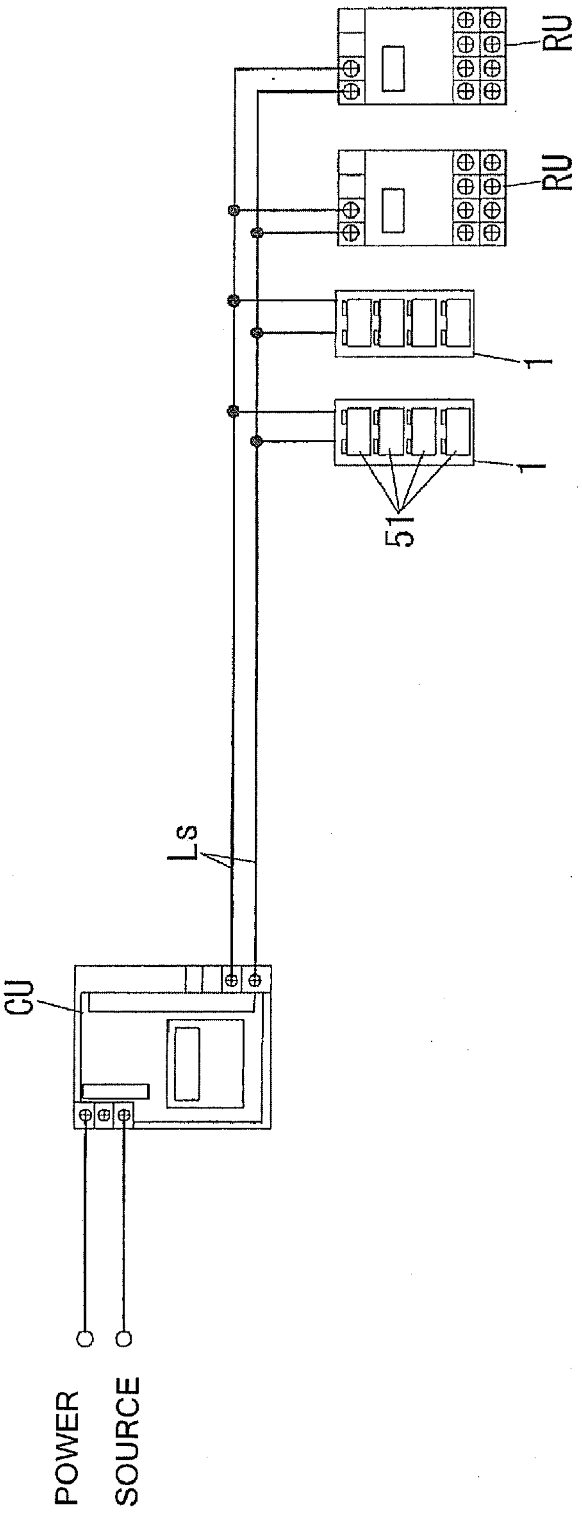
FIG. 28 is an explanatory view showing the schematic configuration of a remote monitoring and control system.
Figure 29:
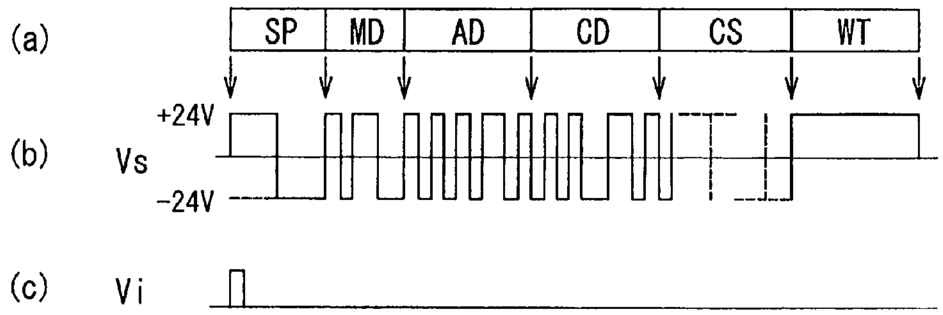
FIGS. 29A, 29B and 29C are explanatory views illustrating one example of a transmission signal, FIG. 29A showing a data structure, FIG. 29B showing one example of a waveform and FIG. 29C showing one example of a waveform of an interrupt signal.

Instead of holding the name cards 7 in the decoration cover 6, four name card holding portions 32*n* for holding the name cards 7 in place may be provided in the housing 3 as illustrated in FIGS. 21 through 23. As a further alternative, name card holding portions 44 for holding the name cards 7 in place may be provided in each of the light guide members 4 as shown in FIGS. 24 through 27. More specifically, the card insertion slots 61*c* are eliminated from the cover body 61 of the decoration cover 6 in the examples shown in FIGS. 21 through 23 and FIGS. 24 through 27. Instead, the through-holes 61*a* have such a size and shape that the name cards 7 and the name card holding portions 32*n* or 44 as well as the light guide portions 41 and the push button handle portions 51 can be inserted through the through-holes 61*a*. At four places of the front surface of the cover 32 above each of the through-holes 32*i*, rectangular seat portions 320 making contact with the rear surfaces of the name cards 7 are formed to protrude forwards. Each of the name card holding portions 32*n* or 44*a* includes support portions 32*p* or 44*a* having a substantially u-shaped cross section and front walls 32*q* or 44*b* provided in the left and right end portions of the support portions 32*p* or 44*a*. The support portions 32*p* or 44*a* are configured to support the name cards 7 while restraining transverse displacement of the name cards 7. Each of the front walls 32*q* or 44*b* has a rear surface positioned in front of the front surface of each of the seat portions 320 of the cover 32 to restrain forward displacement of each of the name cards 7. As indicated by an arrow A2 in FIGS. 23 and 27, the name cards 7 are inserted from above between the seat portions 320 of the cover 32 and the front walls 32*q* or 44*b* of the name card holding portions 32*n* or 44. This makes it possible to hold the name cards 7 in place with respect to the housing 3. If the name cards 7 are held in place by providing the name card holding portions 32*n* or 44 in the housing 3 or the light guide members 4 as stated above, the name cards 7 seldom get out of position during attachment and removal of the decoration cover 6 as compared to a case where the name cards 7 would be held in place by the decoration cover 6.

What is claimed is:

1. An operation terminal for use in a remote monitoring and control system which includes an operation terminal including a plurality of control switches each having a push button handle portion arranged to receive a pressing force applied from the front side thereof, each of the control switches having a specific address set in the operation terminal, a control terminal connected to a load having a specific address set in the control terminal, and a transmission control unit for sending and receiving a transmission signal by a time-multiplexed transmission method to and from the operation terminal and the control terminal via signal lines, generating load control data based on monitoring data sent from the operation terminal when each of the control switches is operated, and sending the control data to the control terminal connected to the load which is associated with the operated control switch by predetermined relational data, the operation terminal comprising:

a communication unit connected to the signal lines and configured to send monitoring data to the transmission control unit;

an operation terminal control unit for, when the push button handle portion of one of the control switches is pushed, generating monitoring data which contains information on the address allotted to the pushed one of the control switches and controlling the communication unit to send the monitoring data to the transmission control unit;

a plurality of on-period light-emitting units provided in a one-to-one correspondence to the control switches and controlled by the operation terminal control unit to emit light when the load associated with the corresponding one of the control switches by relational data is in an on-state;

a plurality of off-period light-emitting units provided in a one-to-one correspondence to the control switches and controlled by the operation terminal control unit to emit light when the load associated with the corresponding one of the control switches by relational data is in an off-state; and a housing for accommodating the operation terminal control unit and holding the control switches, the communication unit, the on-period light-emitting units and the on-period light-emitting units in place, the housing being fixed to an installation surface, wherein at least one half of the control switches are arranged one above another in a vertical direction and each of the on-period light-emitting units is arranged in such a fashion as to transversely interpose the corresponding one of the control switches between itself and the corresponding one of the off-period light-emitting units when seen from the front side, and wherein each of the on-period light-emitting units and the off-period light-emitting units has a front surface protrudes forwards beyond a front surface of the push button handle portion.

2. The operation terminal of claim 1, wherein the control switches are eight in number and are arranged in four rows and in two columns.

3. An operation terminal for use in a remote monitoring and control system including an operation terminal including one or more control switches each having a push button handle portion arranged to receive a pressing force applied from the front side thereof, each of the control switches having a specific address set in the operation terminal, a control terminal connected to a load having a specific address set in the control terminal, and a transmission control unit for sending and receiving a transmission signal by a time-multiplexed transmission method to and from the operation terminal and the control terminal via signal lines, generating load control data based on monitoring data sent from the operation terminal when each of the control switches is operated, and sending the control data to the control terminal connected to the load which is associated with the operated control switch by predetermined relational data, the operation terminal comprising:

a communication unit connected to the signal lines and configured to send monitoring data to the transmission control unit;

a plurality of light-emitting units provided in a pair to each of the control switches and configured to emit light to indicate operating status of the load associated with the corresponding one of the control switches by relational data;

an operation terminal control unit for, when the push button handle portion of one of the control switches is pushed, generating monitoring data which contains information on the address allotted to the pushed one of the control switches, the operation terminal control unit controlling the communication unit to send the monitoring data to the transmission control unit and controlling each of the light-emitting units; and a housing for accommodating the operation terminal control unit and holding the control switches, the communication unit and the light-emitting units in place, the housing being fixed to an installation surface, wherein each of the light-emitting unit includes a light-emitting element for emitting light under the control of the operation terminal control unit and a light guide portion for guiding the light from the light-emitting element frontwards, and two or more light guide portions are made of a single light guide member formed of a transparent material.

4. The operation terminal of claim 3, wherein the operation terminal comprises a plurality of light guide members, and wherein each of the light guide members includes an engagement portion engaged with the housing, so that it is held in place with respect to the housing by the engagement of the engagement portion.

5. The operation terminal of claim 3, wherein the control switches are eight in number and are arranged in four rows and in two columns, wherein the operation terminal comprises a plurality of light guide members, and wherein the light guide portions of the four light-emitting units corresponding to two control switches arranged in a same row are provided in each of the light guide members.

6. The operation terminal of claim 3, further comprising:

a decoration cover removably attached to the housing to cover at least a part of the front surface of the housing when seen from the front side; and at least one name card holding portion for holding a name card having information on each of the control switch in place, the name card holding portion being provided in the housing.

7. The operation terminal of claim 3, further comprising:

a decoration cover removably attached to the housing to cover at least a part of the front surface of the housing when seen from the front side; and at least one name card holding portion for holding a name card having information on each of the control switches in place, the name card holding portion being provided in each of the light guide members.

8. An operation terminal for use in a remote monitoring and control system which includes an operation terminal including a plurality of control switches each having a push button handle portion arranged to receive a pressing force applied from the front side thereof, each of the control switches having a specific address set in the operation terminal, a control terminal connected to a load having a specific address set in the control terminal, and a transmission control unit for sending and receiving a transmission signal by a time-multiplexed transmission method to and from the operation terminal and the control terminal via signal lines, generating load control data based on monitoring data sent from the operation terminal when each of the control switches is operated, and sending the control data to the control terminal connected to the load which is associated with the operated control switch by predetermined relational data, the operation terminal comprising:

a communication unit connected to the signal lines and configured to send monitoring data to the transmission control unit;

two light receiving units each receiving an optical signal indicative of the address of each of the control switches, each of the light receiving units having a light-receiving element for converting the optical signal to an electric signal;

an operation terminal control unit for, when the light receiving unit receives an optical signal indicative of the address of any one of the control switches, setting the address of the corresponding control switch in accordance with the optical signal and for, when the push button handle portion of one of the control switches is pushed, generating monitoring data which contains information on the address allotted to the pushed one of the control switches, the operation terminal control unit controlling the communication unit to send the monitoring data to the transmission control unit; and a housing for accommodating the light receiving units and the operation terminal control unit and holding the control switches and the communication unit in place, the housing being fixed to an installation surface, wherein the optical signal is incident on each of the light-receiving elements of the light receiving units through two signal windows provided correspondingly to the light receiving units in the housing, and a signal barrier wall for preventing the optical signal coming through one of the signal windows from being incident on the light-receiving element of the light receiving unit corresponding to the other signal window.

9. The operation terminal of claim 8, further comprising:

at least one push button handle member including a plurality of the push button handle portions which are formed of a synthetic resin in a single body.

10. The operation terminal of claim 9, further comprising:

one or more light-emitting units provided to each of the control switches and controlled by the operation terminal control unit to indicate operating status of the load associated with the corresponding one of the control switches by relational data, the light-emitting units being held in place by the housing, wherein each of the light-emitting units has a light-emitting element for emitting light under the control of the operation terminal control unit and a light guide portion through which the light from the light-emitting element is projected frontwards, and the push button handle member has at least one partition wall disposed between the light-emitting element and the light guide portion of the adjacent light-emitting units, the partition wall serving to prevent the light from the light-emitting element from being incident on the light guide portion.

11. The operation terminal of claim 4, wherein the engagement portion protrudes backwards, and includes a hooking claw protruding outwards in a vertical direction, and wherein a plurality of hooking grooves are formed at the housing, so that each of the light guide members is held in place with respect to the housing by the engagement of the hooking claw and each of the hooking grooves.

* * * * *